(12) United States Patent
Jeram et al.

(10) Patent No.: US 8,198,357 B2
(45) Date of Patent: *Jun. 12, 2012

(54) METHOD FOR PRODUCING MOLDED SILICONE RUBBER PRODUCTS USING LIQUID SILICONE RUBBER

(75) Inventors: Edward Jeram, Burnt Hills, NY (US); Reeshemah Beaty Chatham, Simi Valley, CA (US); Robert Higley, Plover, WI (US)

(73) Assignee: Bluestar Silicones USA Corp., East Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,943

(22) Filed: Jun. 9, 2011

(65) Prior Publication Data

US 2011/0245403 A1    Oct. 6, 2011

Related U.S. Application Data

(63) Continuation of application No. 12/511,399, filed on Jul. 29, 2009.

(60) Provisional application No. 61/207,855, filed on Jul. 30, 2008, provisional application No. 61/175,614, filed on May 5, 2009.

(51) Int. Cl.
    C08L 43/04    (2006.01)
    B29C 71/00    (2006.01)
(52) U.S. Cl. .................... 524/506; 524/547; 264/236
(58) Field of Classification Search .................... None
    See application file for complete search history.

(56) References Cited

U.S. PATENT DOCUMENTS

| | | | |
|---|---|---|---|
| 2,406,621 A | 8/1946 | Marsden |
| 2,857,356 A | 10/1958 | Goodwin, Jr. |
| 2,938,009 A | 5/1960 | Lucas |
| 3,024,126 A | 3/1962 | Brown |
| 3,159,601 A | 12/1964 | Ashby |
| 3,159,662 A | 12/1964 | Ashby |
| 3,220,972 A | 11/1965 | Lamoreaux |

(Continued)

FOREIGN PATENT DOCUMENTS

WO    2006127100    11/2006

OTHER PUBLICATIONS

Liebhafsky, Herman A., "Silicones Under the Monogram", A Story of Industrial Research, A Wiley-Inerscience Publication, pp. 99-101.

(Continued)

*Primary Examiner* — Robert S Loewe
(74) *Attorney, Agent, or Firm* — Baker, Donelson, Bearman, Caldwell & Berkowitz, P.C.

(57) ABSTRACT

Described is a method for producing a molded silicone rubber product using a liquid silicone rubber (LSR) base comprising at least one vinyl siloxane polymer, at least one hydride crosslinker, and optionally at least one injection molding inhibitor. The single LSR base is fed into a feed line, and into the feed line are fed an inhibitor master batch comprising at least one liquid injection molding inhibitor and at least one vinyl siloxane polymer, and a catalyst master batch comprising at least one catalyst and at least one vinyl siloxane polymer. The invention is further directed to: said LSR base; said inhibitor master batch; said catalyst master batch; and a molded silicone rubber article produced by the methods and compositions described herein.

25 Claims, 15 Drawing Sheets

U.S. PATENT DOCUMENTS

| | | | |
|---|---|---|---|
| 3,365,743 A | 1/1968 | Haggstrom | |
| 3,445,420 A | 5/1969 | Kookootsedes et al. | |
| 3,697,473 A | 10/1972 | Polmanteer et al. | |
| 3,715,334 A | 2/1973 | Karstedt | |
| 3,728,053 A * | 4/1973 | Stillhard et al. | 425/4 R |
| 3,775,452 A | 11/1973 | Karstedt | |
| 3,814,730 A | 6/1974 | Karstedt | |
| 3,847,848 A | 11/1974 | Beers | |
| 3,884,866 A | 5/1975 | Jeram et al. | |
| 3,989,668 A | 11/1976 | Lee et al. | |
| 3,989,688 A | 11/1976 | Mazzacca | |
| 4,160,858 A | 7/1979 | Roedel | |
| 4,162,243 A | 7/1979 | Lee et al. | |
| 4,239,877 A | 12/1980 | Roedel | |
| 5,543,092 A * | 8/1996 | Ibar | 264/40.1 |
| 5,674,966 A | 10/1997 | McDermott | |
| 5,677,411 A | 10/1997 | Ward | |
| 5,928,564 A | 7/1999 | McDermott et al. | |
| 5,977,220 A | 11/1999 | Burkus, II et al. | |
| 6,013,715 A * | 1/2000 | Gornowicz et al. | 524/492 |
| 6,034,199 A | 3/2000 | McDermott et al. | |
| 6,103,819 A * | 8/2000 | Lewis et al. | 524/731 |
| 6,187,890 B1 * | 2/2001 | Fehn et al. | 528/15 |
| 6,254,813 B1 * | 7/2001 | Eckardt et al. | 264/39 |
| 6,464,923 B2 | 10/2002 | Tsuji et al. | |
| 6,576,179 B1 * | 6/2003 | Abe et al. | 264/328.18 |
| 6,776,600 B1 * | 8/2004 | Zahoransky et al. | 425/130 |
| 2001/0011117 A1 * | 8/2001 | Pesch et al. | 525/103 |
| 2001/0026819 A1 | 10/2001 | Gould | |
| 2003/0057606 A1 * | 3/2003 | Brix et al. | 264/328.6 |
| 2005/0089696 A1 | 4/2005 | Bosshammer | |
| 2010/0144933 A1 * | 6/2010 | Irie | 524/100 |

OTHER PUBLICATIONS

Zumbrum; M.A., "Acid/Base Properties of Fumed Silica Fillers Used in Silicone Elastomers", J. Adhesion, 1994, vol. 46, pp. 181-196.

Osswald, Tim A. "Injection Molding Handbook." 2007, Hanser Verlag, pp. 158-179.

"International Search Report," International Patent Application No. PCT/US09/52120 (Oct. 14, 2009).

C. Rauwendaal, et al., "New Intermeshing Pin (VIP) Mixer for Injection Molding", at http://www.rauvvendaal.com/images/ANTEC_2003_New_VIP_mixer.pdf (last visited Feb. 18, 2010), cited in ISR from PCT/US09/52120.

* cited by examiner

METHOD FOR PRODUCING MOLDED SILICONE RUBBER PRODUCTS USING LIQUID SILICONE RUBBER

CROSS-REFERENCE TO RELATED APPLICATIONS

This Non-Provisional Patent Application is a continuation application of U.S. patent application Ser. No. 12/511,399 filed on Jul. 29, 2009, which claims the benefit of U.S. Provisional Patent Application No. 61/207,855, filed on Jul. 30, 2008, and of U.S. Provisional Patent Application No. 61/175,614, filed on May 5, 2009, each of which is hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The invention relates to method of preparing molded silicone rubber products using liquid silicone rubber (LSR). In particular, the invention uses a new liquid silicone rubber composition and process to produce cured silicone rubber products faster, with less equipment and less product variability.

2. Description of Related Art

Processes using liquid silicone rubbers (LSR) to form molded silicone rubber products have been around for almost four decades. Liquid silicone rubbers belong to the group of heat-curing rubbers. A characteristic feature is their low viscosity during processing compared to solid silicones or elastomers. Two-component mixtures increasingly crosslink by the addition process. This means that the reaction takes place without any decomposition product forming. This is an important benefit for the injection molding field since there are no byproducts of cure, there is no concern of deposits forming on the molds.

Typically, a two part platinum catalyzed addition cure reaction is used to make LSR molded rubber products, wherein the first component is a mixture of vinylsiloxane polymers, treated amorphous fumed silica, and platinum catalyst (component A) and the second component is a mixture of vinylsiloxane polymers, treated amorphous fumed silica, hydrogen siloxane crosslinking polymers, and a cure rate inhibitor (component B).

The A and B components are separately pumped and metered through a static mixer. The A and B mixture is further mixed in the LSR machine transferring screw prior to injection into the mold. The A and B mixture is then heat cured at a specific time and temperature depending on the part size. The finished cured product is automatically ejected from the mold, and the process repeated.

U.S. Pat. No. 3,884,866 discloses a two part LSR process using two different vinylsiloxane polymers, a platinum catalyst, and pre-treated silica filler for the first component, and the same vinylsiloxane polymers and pretreated silica filler plus a hydrogen containing polysiloxane and cure rate inhibitor as the second component. U.S. Pat. No. 4,162,243 discloses a two part LSR process using an in situ treated amorphous silica filler. U.S. Pat. No. 5,977,220 discloses a two part LSR process using a nitrogen organic cation salt to improve the compression set of the silicone mixture. U.S. Pat. No. 6,034,199 discloses a two part LSR process with improved cure rate inhibitors. U.S. Pat. No. 6,464,923 discloses a three part LSR process. The first component is a diorganopolysiloxane polymer and inorganic filler; the second component is a liquid catalyst and diorganopolysiloxane polymer mixture; and the third component is hydrogen siloxane mixed with an organopolysiloxane polymer. The patent also discloses the use of carbon black as an inorganic filler. The three separate parts result in improved storage stability over a two part LSR process.

BRIEF SUMMARY OF THE INVENTION

There are several problems in the two part LSR process. The first is potential for the off ratio metering and mixing of the two separate components, which results in unbalanced amounts of silicone hydride crosslinker present in the finished products. This can result in erratic injection cure rates and cured parts with variable physical properties. The second problem is the need for expensive equipment to pump the two separate mixtures into the metering and mixing device, plus the need for a metering and mixing devices at all. A third problem is the large and specific (non variable, or set) amount of inhibitor present in the second component that is required to obtain a multi-day room temperature work life. The inhibitor level can slow down the cure rate of the molded product.

The present invention provides improved processes suitable for the manufacture of molded silicone rubber products using LSR. The process uses a single LSR base comprising vinyl siloxane polymers, and silicone hydride cross linkers, but not catalyst. Optional base components may include liquid injection molding inhibitors, additional vinyl siloxane polymers, hydride crosslinkers, fillers, releasing agents, and pre-structuring compounds, but—again—not catalyst. The process also comprises a catalyst master batch comprising at least one catalyst and at least one vinyl siloxane polymer. The process may also comprise an inhibitor master batch comprising at least one liquid injection molding inhibitor and at least one vinyl siloxane polymer.

The single base may then be fed into an injection molding machine (IMM) via one entry point, and the catalyst master batch may be fed into the IMM via a second entry point. Alternatively, the inhibitor master batch may be fed into the IMM via a third entry point. The single base, catalyst master batch, and inhibitor master batch (if used) enter the IMM barrel via separate entry points and are mixed together by operation of the IMM.

Alternatively, the single base may be fed from a base storage tank into a base feed line, wherein the base feed line conducts the base into the barrel of an injection molding machine. An inhibitor master batch storage tank may feed—via an injector—the inhibitor master batch into the base feed line at a first point, and the catalyst master batch storage tank may feed—via an injector—the catalyst master batch into the base feed line at a second point, wherein the second point is between the first point and the IMM barrel. Preferably, the catalyst master batch is fed into the base feed line at a point as close as possible to the IMM barrel. In one variation of this process, the base feed line feeds into the injection molding machine without any static or dynamic mixers in the line. In another variation, the base feed line feeds into a first dynamic or static mixer located between the first point and before the second point. In another variation, the base feed line feeds into a second dynamic or static mixer located between the second point and IMM barrel. In yet another variation, the base feed line feeds into a first dynamic or static mixer located between the first point and before the second point, and into a second dynamic or static mixer located between the second point and IMM barrel; the first and second dynamic or static mixers may be, independently of one another, dynamic or static. In still another variation, the base feed line feeds into an "orifice," which serves to temporarily constrict the flow of material through the base feed line and so cause localized turbulent mixing or dispersion. Without intending to be limited thereby, an exemplary orifice useful with the present invention is approximately 0.125 inches thick and possesses a circular opening about 0.1 inch in diameter, which opening is less than the inner diameter of the base feed line.

Adjusting the injector shot size of the injectors is useful for adequate mixing of the components of the invention. "Injector shot size" is the amount of master batch (either inhibitor master batch or catalyst master batch) material injected into the stream (the stream of material in the base feed line) each time the injector fires. The purpose of varying and controlling injector shot size is to ensure that the proper amount of catalyst and inhibitor are present in the base. "Mold shot size" is the amount of LSR material injected into the mold for each cycle of production. The purpose of varying and controlling the mold shot size is to inject the appropriate amount of base, containing catalyst and inhibitor, into a heated metal cavity— the mold. For example, the injector shot size may be from about 0.01 grams to about 0.25 grams, and preferably from about 0.1 grams to about 0.15 grams. As will be recognized by those having ordinary skill in the art, the optimal mold shot size is a function of the size of the final molded product. For example, a smaller part may require only a few grams of the injected material per mold shot, so less of the injected material is required with each shot. On the other hand, larger parts may require hundreds of grams of the injected material per mold shot, in which case more of the injected material is required with each mold shot. In the event that less of the injected material is injected into the stream, more frequent injector shots (e.g., at least 2 shots per second at the lower injector shot size range) may be required to achieve an appropriate amount of injected material. Similarly, in the event that more of the injected material is injected into the stream, less frequent injector shots may be required. Thus, by controlling both the injector shot size and the injection frequency one may enjoy significant control over the final product.

The single base of the present invention reduces metering errors associated with mixing the vinyl siloxane and hydride cross linkers prior to injection into the mold, reduces cure time, and reduces equipment cost, all compared to a two part LSR process. Further, the stability or work-life of the LSR mixture in the injection molding machine is improved because the platinum catalyst is separately controlled. Instead of the three- to five-day room temperature work life resulting from standard two-part LSR techniques, the methods of the present invention yield an infinite room temperature pot life because the platinum catalyst feed (the platinum master batch feed, or "Pt MBX" feed) may simply be turned off. Moreover, the present invention employs an inhibitor master batch ("Inhibitor MBX"), by which the molder can control cure speed: smaller parts may be cured faster (using lower inhibitor levels), and larger parts may be cured more slowly (using higher inhibitor levels), allowing the reliable manufacture of perfect-quality parts by allowing the heated mold cavity to be completely filled before curing.

The principal improvements of the processes of the present invention center around the consistent production of high-quality molded parts and providing cure-speed control to the molder. With the present invention, these advantages are achieved in part through control over the catalyst master batch (which may be turned on or off), the selection and maintenance of a constant vinyl:hydride ratio in the base, and selective control of the inhibitor level. The present invention stands in contrast to prior art standard two-part LSR processes which possess a predetermined cure speed that is dictated by the set inhibitor level, cannot be modified, and is subject to vinyl:hydride ratio variation due to pumping variability.

Additional configurations may include: removing the inhibitor from the base and feeding it directly into the mixer, and separately feeding a portion of the vinyl siloxane polymers into the mixer (e.g., with the inhibitor). These, and other configurations, are explained more fully below.

According to one aspect of the invention, a process is provided for making molded silicone rubber products using a single LSR base.

In one embodiment, a method for producing a molded silicone rubber product is disclosed, the method comprising: a) feeding into a base feed line a liquid silicone rubber base comprising: i) at least one vinyl siloxane polymer; and at least one hydride crosslinker; b) feeding into a catalyst feed line a catalyst master batch comprising: i) at least one catalyst; and optionally, at least one vinyl siloxane polymer; c) optionally feeding into an optional inhibitor feed line an optional inhibitor master batch comprising: i) at least one liquid injection molding inhibitor; and optionally, at least one vinyl siloxane polymer; d) optionally feeding into an optional additive feed line an optional at least one additive; e) directing said liquid silicone rubber base via said base feed line, and said catalyst master batch via said catalyst feed line, optionally directing said optional inhibitor master batch via said optional inhibitor feed line, and optionally directing said optional at least one additive via said optional additive feed line, into the barrel of an injection molding machine; f) operating said injection molding machine, thereby mixing said liquid silicone rubber base, said catalyst master batch, said optional inhibitor master batch, and said optional at least one additive; and g) curing said mixed liquid silicone rubber base, catalyst master batch, optional inhibitor master batch, and optional at least one additive by heating.

In one aspect of this embodiment, the at least one vinyl siloxane polymer of the liquid silicone rubber base, the catalyst master batch, and the optional inhibitor master batch are independently selected from the group consisting of Formula I-3, Formula I-4, Formula I-5, Formula I-6, and Formula I-7, as defined below, and combinations thereof, wherein: the radical R are, independently, selected from the group consisting of monovalent hydrocarbon radicals and halogenated monovalent hydrocarbon radicals; the radical $R^1$ are, independently, selected from the group consisting of phenyl, lower alkenyl of 2 to 8 carbon atoms, lower alkyl of 1 to 8 carbon atoms and mononuclear aryl radicals; the radical $R^2$ are, independently, selected from the group consisting of an alkyl radical, a mononuclear aryl radical, a lower alkyl radical of 1 to 8 carbon atoms, a phenyl radical, lower alkenyl of 2 to 8 carbon atoms, and a vinyl group; the radical R" are, independently, selected from the same groups as the radical R'; Vi denotes vinyl; m is an integer from about 100 to about 10,000; n is an integer from about 100 to about 400; o is an integer from about 2 to about 8; p is an integer from about 100 to about 200; q is an integer from about 5 to about 15; w is an integer from about 0 to about 500; x is an integer from about 100 to about 10,000; y is an integer from about 0 to about 300; and z is an integer from about 0 to about 200.

In another aspect of this embodiment, the at least one hydride crosslinker is selected from the group consisting of: Formula II-3, Formula II-4, Formula II-5, Formula II-6, and Formula II-7, as defined below, and combinations thereof, wherein: each $R^4$ is selected, independently, from the group consisting of hydrogen, monovalent hydrocarbon radicals, and halogenated monovalent hydrocarbon radicals; each $R^5$ radical is selected, independently, from the group consisting of monovalent hydrocarbon radicals, and halogenated monovalent hydrocarbon radicals; s is an integer from about 1 to about 1000; t is an integer from about 5 to about 200; u is an integer from about 14 to about 30; v is an integer from about 12 to about 21; w is an integer from about 2 to about 8; x is an integer from about 3 to about 9; y is an integer from about 5 to about 15; M is monofunctional trimethylsilyl or $(CH_3)_3SiO_{1/2}$; H is hydrogen; and Q is tetrafunctional silicon dioxide or $SiO_{4/2}$. Preferably, at least three $R^4$ groups of Formula II-3 are hydrogen.

In yet another aspect of this embodiment, the at least one catalyst is a platinum complex formed from a reaction between $H_2PtCl_6+6H_2O+$ dimethyl vinyl terminated polydimethylsiloxane polymer. Additionally, the at least one liquid injection molding inhibitor of the optional inhibitor master batch may be selected from the group consisting of: Formula III, Formula VI, and combinations thereof, wherein: a) $R^1$ has the formula of Formula IV; b) $R^2$ is selected from the group consisting of Formula IV, hydrogen, triorganosilyl radicals, siloxanes, and Formula V; c) $R^3$ is selected from the group consisting of: of divalent hydrocarbon radicals consisting of linear or branched alkyl radicals having from about 1 to about 10 carbon atoms; linear or branched alkenyl radicals having from about 1 to about 10 carbon atoms; linear or branched alkynyl radicals having from about 1 to about 10 carbon atoms; cycloalklyl radicals having from about 3 to about 12 carbon atoms; cycloalkenyl radicals having from about 3 to about 12 carbon atoms; cycloalkynyl radicals having from about 8 to about 16 carbon atoms; fluorinated linear or branched alkyl radicals having from about 1 to about 10 carbon atoms; chlorinated linear or branched alkyl radicals having from about 1 to about 10 carbon atoms; brominated linear or branched alkyl radicals having from about 1 to about 10 carbon atoms; fluorinated linear or branched alkenyl radicals having from about 1 to about 10 carbon atoms; chlorinated linear or branched alkenyl radicals having from about 1 to about 10 carbon atoms; brominated linear or branched alkenyl radicals having from about 1 to about 10 carbon atoms; fluorinated linear or branched alkynyl radicals having from about 1 to about 10 carbon atoms; chlorinated linear or branched alkynyl radicals having from about 1 to about 10 carbon atoms; brominated linear or branched alkynyl radicals having from about 1 to about 10 carbon atoms; hydrocarbonoxy radicals containing at least two carbon atoms; fluorinated hydrocarbonoxy radicals containing at least two carbon atoms; chlorinated hydrocarbonoxy radicals containing at least two carbon atoms; brominated hydrocarbonoxy radicals containing at least two carbon atoms; aryl radicals; linear or branched alkyl aryl radicals; fluorinated aryl radicals; chlorinated aryl radicals; brominated aryl radicals; fluorinated linear or branched alkyl-, alkenyl-, or alkynyl aryl radicals; chlorinated linear or branched alkyl-, alkenyl-, or alkynyl aryl radicals; and brominated linear or branched alkyl-, alkenyl-, or alkynyl aryl radicals; d) $R^4$ is selected from the group of monovalent radicals consisting of: hydrogen, linear or branched alkyl radicals having from about 1 to about 10 carbon atoms; linear or branched alkenyl radicals having from about 1 to about 10 carbon atoms; linear or branched alkynyl radicals having from about 1 to about 10 carbon atoms; cycloalklyl radicals having from about 3 to about 12 carbon atoms; cycloalkenyl radicals having from about 3 to about 12 carbon atoms; cycloalkynyl radicals having from about 8 to about 16 carbon atoms; fluorinated linear or branched alkyl radicals having from about 1 to about 10 carbon atoms; chlorinated linear or branched alkyl radicals having from about 1 to about 10 carbon atoms; brominated linear or branched alkyl radicals having from about 1 to about 10 carbon atoms; fluorinated linear or branched alkenyl radicals having from about 1 to about 10 carbon atoms; chlorinated linear or branched alkenyl radicals having from about 1 to about 10 carbon atoms; brominated linear or branched alkenyl radicals having from about 1 to about 10 carbon atoms; fluorinated linear or branched alkynyl radicals having from about 1 to about 10 carbon atoms; chlorinated linear or branched alkynyl radicals having from about 1 to about 10 carbon atoms; brominated linear or branched alkynyl radicals having from about 1 to about 10 carbon atoms; hydrocarbonoxy radicals containing at least two carbon atoms; fluorinated hydrocarbonoxy radicals containing at least two carbon atoms; chlorinated hydrocarbonoxy radicals containing at least two carbon atoms; brominated hydrocarbonoxy radicals containing at least two carbon atoms aryl radicals; linear or branched alkyl aryl radicals; fluorinated aryl radicals; chlorinated aryl radicals; brominated aryl radicals; fluorinated linear or branched alkyl-, alkenyl-, or alkynyl aryl radicals; chlorinated linear or branched alkyl-, alkenyl-, or alkynyl aryl radicals; brominated linear or branched alkyl-, alkenyl-, or alkynyl aryl radicals; and triorganosilyl radicals; and e) R is selected from the group consisting of: hydrogen; alkyl; phenyl; and $C_xH_y$, where x is an integer from about 2 to about 10, and y is an integer from about 4 to about 21.

In a further aspect of this embodiment, the optional at least one additive is selected from the group consisting of color master batches, UV stabilizers, light stabilizers, self bonding additives, anti-microbial additives, thermal stabilizers, release agents, antistatic additives, flame proofing additives, low compression set additives, durometer adjustment additives, oil resistance additives, anti-crepe hardening additives, mold release additives, plasticizers, thickening or consistency increase additives, blowing agents, and combinations thereof.

In another aspect of this embodiment, the liquid silicone rubber base further comprises at least one filler, and the filler may be in situ treated fumed silica treated with hexamethyldisilazane and tetramethyldivinyldisilazane. Additionally, the liquid silicone rubber base may further comprise at least one pre-structuring compound. The pre-structuring compound may comprise Formula X, wherein R is selected from the group consisting of monovalent hydrocarbon radicals, and halogenated monovalent hydrocarbon radicals; and n is an integer from about 0 to about 12. The liquid silicone rubber base of this embodiment may further comprise at least one release agent. The at least one release agent may have the formula $M_xQ^{OH}$, wherein x is an integer from about 1 to about 3.

In a further aspect of this embodiment, the base feed line feeds into the barrel of the injection molding machine, and said catalyst feed line feeds into said base feed line, the liquid silicone rubber base may further comprise at least one liquid injection molding inhibitor, and the optional inhibitor feed line may feed into the base feed line.

In a further aspect of this embodiment, the base feed line feeds separately into the barrel of the injection molding machine, the catalyst feed line feeds separately into the barrel of the injection molding machine, the optional inhibitor feed line feeds separately into the barrel of the injection molding machine, and the optional additive feed line feeds separately into the barrel of the injection molding machine.

In another embodiment, a method of producing a molded silicone rubber product is disclosed comprising: (a) feeding into an injection molding machine a liquid silicone rubber base comprising: (1) at least one vinyl siloxane polymer; and (2) at least one hydride crosslinker; (b) feeding into said injection molding machine an inhibitor master batch comprising: (1) at least one liquid injection molding inhibitor; and (2) at least one vinyl siloxane polymer; (c) feeding into said injection molding machine a catalyst master batch comprising: (1) at least one catalyst; and (2) at least one vinyl siloxane polymer; (d) operating said injection molding machine, thereby mixing said liquid silicone rubber base, said inhibitor master batch, and said catalyst master batch; and (e) curing said mixed liquid silicone rubber base, inhibitor master batch, and catalyst master batch by heating. Optionally, the liquid silicone rubber base of step (a) may further comprise: (3) at least one liquid injection molding inhibitor. Preferably, the optional at least one liquid injection molding inhibitor of step (a) is present in a trace amount.

In another embodiment, a method of producing a molded silicone rubber product is disclosed comprising: (a) feeding into an injection molding machine a liquid silicone rubber base comprising: (1) at least one vinyl siloxane polymer; (2) at least one hydride crosslinker; and (3) at least one filler; (b) feeding into said injection molding machine an inhibitor master batch comprising: (1) at least one liquid injection molding inhibitor; and (2) at least one vinyl siloxane polymer; (c) feeding into said injection molding machine a catalyst master batch comprising: (1) at least one catalyst; and (2) at least one vinyl siloxane polymer; (d) operating said injection molding machine, thereby mixing said liquid silicone rubber base, said inhibitor master batch, and said catalyst master batch; and (e) curing said mixed liquid silicone rubber base, inhibitor master batch, and catalyst master batch by heating. Optionally, the liquid silicone rubber base of step (a) may further comprise: (4) at least one liquid injection molding inhibitor. Preferably, the optional at least one liquid injection molding inhibitor of step (a) is present in a trace amount.

In another embodiment, a method of producing a molded silicone rubber product is disclosed comprising: (a) feeding into an injection molding machine a liquid silicone rubber base comprising: (1) at least one vinyl siloxane polymer; (2) at least one hydride crosslinker; (3) at least one filler; and (4) at least one pre-structuring compound; (b) feeding into said injection molding machine an inhibitor master batch comprising: (1) at least one liquid injection molding inhibitor; and (2) at least one vinyl siloxane polymer; (c) feeding into said injection molding machine a catalyst master batch comprising: (1) at least one catalyst; and (2) at least one vinyl siloxane polymer; (d) operating said injection molding machine, thereby mixing said liquid silicone rubber base, said inhibitor master batch, and said catalyst master batch; and (e) curing said mixed liquid silicone rubber base, inhibitor master batch, and catalyst master batch by heating. Optionally, the liquid silicone rubber base of step (a) may further comprise: (5) at least one liquid injection molding inhibitor. Preferably, the optional at least one liquid injection molding inhibitor of step (a) is present in a trace amount.

In another embodiment, a method of producing a molded silicone rubber product is disclosed comprising: (a) feeding into an injection molding machine a liquid silicone rubber base comprising: (1) at least one vinyl siloxane polymer; (2) at least one hydride crosslinker; (3) at least one filler; (4) at least one pre-structuring compound; and (5) at least one silicone release agent; (b) feeding into said injection molding machine an inhibitor master batch comprising: (1) at least one liquid injection molding inhibitor; and (2) at least one vinyl siloxane polymer; (c) feeding into said injection molding machine a catalyst master batch comprising: (1) at least one catalyst; and (2) at least one vinyl siloxane polymer; (d) operating said injection molding machine, thereby mixing said liquid silicone rubber base, said inhibitor master batch, and said catalyst master batch; and (e) curing said mixed liquid silicone rubber base, inhibitor master batch, and catalyst master batch by heating. Optionally, the liquid silicone rubber base of step (a) may further comprise: (6) at least one liquid injection molding inhibitor. Preferably, the optional at least one liquid injection molding inhibitor of step (a) is present in a trace amount.

In another embodiment, a method of producing a molded silicone rubber product is disclosed comprising: (a) feeding into an injection molding machine a liquid silicone rubber base comprising: (1) at least one vinyl siloxane polymer; (2) at least one hydride crosslinker; and (3) at least one liquid injection molding inhibitor; (b) feeding into said injection molding machine a catalyst master batch comprising: (1) at least one catalyst; and (2) at least one vinyl siloxane polymer; (c) operating said injection molding machine, thereby mixing said liquid silicone rubber base and said catalyst master batch; and (d) curing said mixed liquid silicone rubber base and catalyst master batch by heating.

In another embodiment, a method of producing a molded silicone rubber product is disclosed comprising: (a) feeding into an injection molding machine a liquid silicone rubber base comprising: (1) at least one vinyl siloxane polymer; (2) at least one hydride crosslinker; (3) at least one filler; and (4) at least one liquid injection molding inhibitor, into an injection molding machine; (b) feeding into said injection molding machine a catalyst master batch comprising: (1) at least one catalyst; and (2) at least one vinyl siloxane polymer; (c) operating said injection molding machine, thereby mixing said liquid silicone rubber base and said catalyst master batch; and (d) curing said mixed liquid silicone rubber base and catalyst master batch by heating.

In a further embodiment, a method of producing a molded silicone rubber product is disclosed comprising: (a) feeding into an injection molding machine a liquid silicone rubber base comprising: (1) at least one vinyl siloxane polymer; (2) at least one hydride crosslinker; (3) at least one filler; (4) at least one pre-structuring compound; and (5) at least one liquid injection molding inhibitor, into an injection molding machine; (b) feeding into said injection molding machine a catalyst master batch comprising: (1) at least one catalyst; and (2) at least one vinyl siloxane polymer; (c) operating said injection molding machine, thereby mixing said liquid silicone rubber base and said catalyst master batch; and (d) curing said mixed liquid silicone rubber base and catalyst master batch by heating.

In yet another embodiment, a method of producing a molded silicone rubber product is disclosed comprising: (a) feeding into an injection molding machine a liquid silicone rubber base comprising: (1) at least one vinyl siloxane polymer; (2) at least one hydride crosslinker; (3) at least one filler; (4) at least one pre-structuring compound; (5) at least one silicone release agent; and (6) at least one liquid injection molding inhibitor, into an injection molding machine; (b) feeding into said injection molding machine a catalyst master batch comprising: (1) at least one catalyst; and (2) at least one vinyl siloxane polymer; (c) operating said injection molding machine, thereby mixing said liquid silicone rubber base and said catalyst master batch; and (d) curing said mixed liquid silicone rubber base and catalyst master batch by heating.

In yet a further embodiment, a method of producing a molded silicone rubber product is disclosed comprising: (a) feeding into a base feed line a liquid silicone rubber base comprising: (1) at least one vinyl siloxane polymer; and (2) at least one hydride crosslinker, wherein said base feed line feeds into the barrel of an injection molding machine; (b) feeding into said base feed line containing said liquid silicone rubber base an inhibitor master batch comprising: (1) at least one liquid injection molding inhibitor; and (2) at least one vinyl siloxane polymer; (c) feeding into said base feed line containing said liquid silicone rubber base and said inhibitor master batch a catalyst master batch comprising: (1) at least one catalyst, and (2) at least one vinyl siloxane polymer; (d) transferring said liquid silicone rubber base, said inhibitor master batch, and said catalyst master batch into the barrel of the injection molding machine via the base feed line; (e) operating said injection molding machine, thereby mixing said liquid silicone rubber base, said inhibitor master batch, and said catalyst master batch; and (f) curing said mixed liquid silicone rubber base, inhibitor master batch, and catalyst master batch by heating. In one aspect of this embodiment, the base feed line feeds into the injection molding machine without any static or dynamic mixers in the line. In another aspect of this embodiment, the base feed line feeds into a dynamic or a static mixer between steps (b) and (c) above. In another aspect of this embodiment, the base feed line feeds into a dynamic or a static mixer between steps (c) and (d) above. In yet another aspect of this embodiment, the base feed line feeds into a dynamic or a static mixer between steps (b) and (c) above, and again between steps (c) and (d) above. Optionally, the liquid silicone rubber base of step (a) may further comprise: (3) at least one liquid injection molding inhibitor. Preferably, the optional at least one liquid injection molding inhibitor of step (a) is present in a trace amount.

In another subsequent embodiment, a method for producing a molded silicone rubber product is disclosed comprising: (a) feeding into a base feed line a liquid silicone rubber base comprising: (1) at least one vinyl siloxane polymer; (2) at least one hydride crosslinker; and (3) at least one filler, wherein said base feed line feeds into the barrel of an injection molding machine; (b) feeding into said base feed line containing said liquid silicone rubber base an inhibitor master batch comprising: (1) at least one liquid injection molding inhibitor; and (2) at least one vinyl siloxane polymer; (c) feeding into said base feed line containing said liquid silicone rubber base and said inhibitor master batch a catalyst master batch comprising: (1) at least one catalyst, and (2) at least one vinyl siloxane polymer; (d) transferring said liquid silicone rubber base, said inhibitor master batch, and said catalyst master batch into the barrel of the injection molding machine via the base feed line; (e) operating said injection molding machine, thereby mixing said liquid silicone rubber base, said inhibitor master batch, and said catalyst master batch; and (f) curing said mixed liquid silicone rubber base, inhibitor master batch, and catalyst master batch by heating. In one aspect of this embodiment, the base feed line feeds into the injection molding machine without any static or dynamic mixers in the line. In another aspect of this embodiment, the base feed line feeds into a dynamic or a static mixer between steps (b) and (c) above. In another aspect of this embodiment, the base feed line feeds into a dynamic or a static mixer between steps (c) and (d) above. In yet another aspect of this embodiment, the base feed line feeds into a dynamic or a static mixer between steps (b) and (c) above, and again between steps (c) and (d) above. Optionally, the liquid silicone rubber base of step (a) may further comprise: (4) at least one liquid injection molding inhibitor. Preferably, the optional at least one liquid injection molding inhibitor of step (a) is present in a trace amount.

In another subsequent embodiment, a method for producing a molded silicone rubber product is disclosed comprising: (a) feeding into a base feed line a liquid silicone rubber base comprising: (1) at least one vinyl siloxane polymer; (2) at least one hydride crosslinker; (3) at least one filler; and (4) at least one pre-structuring compound, wherein said base feed line feeds into the barrel of an injection molding machine; (b) feeding into said base feed line containing said liquid silicone rubber base an inhibitor master batch comprising: (1) at least one liquid injection molding inhibitor; and (2) at least one vinyl siloxane polymer; (c) feeding into said base feed line containing said liquid silicone rubber base and said inhibitor master batch a catalyst master batch comprising: (1) at least one catalyst, and (2) at least one vinyl siloxane polymer; (d) transferring said liquid silicone rubber base, said inhibitor master batch, and said catalyst master batch into the barrel of the injection molding machine via the base feed line; (e) operating said injection molding machine, thereby mixing said liquid silicone rubber base, said inhibitor master batch, and said catalyst master batch; and (f) curing said mixed liquid silicone rubber base, inhibitor master batch, and catalyst master batch by heating. In one aspect of this embodiment, the base feed line feeds into the injection molding machine without any static or dynamic mixers in the line. In another aspect of this embodiment, the base feed line feeds into a dynamic or a static mixer between steps (b) and (c) above. In another aspect of this embodiment, the base feed line feeds into a dynamic or a static mixer between steps (c) and (d) above. In yet another aspect of this embodiment, the base feed line feeds into a dynamic or a static mixer between steps (b) and (c) above, and again between steps (c) and (d) above. Optionally, the liquid silicone rubber base of step (a) may further comprise: (5) at least one liquid injection molding inhibitor. Preferably, the optional at least one liquid injection molding inhibitor of step (a) is present in a trace amount.

In another subsequent embodiment, a method for producing a molded silicone rubber product is disclosed comprising: (a) feeding into a base feed line a liquid silicone rubber base comprising: (1) at least one vinyl siloxane polymer; (2) at least one hydride crosslinker; (3) at least one filler; (4) at least one pre-structuring compound; and (5) at least one silicone release agent, wherein said base feed line feeds into the barrel of an injection molding machine; (b) feeding into said base feed line containing said liquid silicone rubber base an inhibitor master batch comprising: (1) at least one liquid injection molding inhibitor; and (2) at least one vinyl siloxane polymer; (c) feeding into said base feed line containing said liquid silicone rubber base and said inhibitor master batch a catalyst master batch comprising: (1) at least one catalyst, and (2) at least one vinyl siloxane polymer; (d) transferring said liquid silicone rubber base, said inhibitor master batch, and said catalyst master batch into the barrel of the injection molding machine via the base feed line; (e) operating said injection molding machine, thereby mixing said liquid silicone rubber base, said inhibitor master batch, and said catalyst master batch; and (f) curing said mixed liquid silicone rubber base, inhibitor master batch, and catalyst master batch by heating. In one aspect of this embodiment, the base feed line feeds into the injection molding machine without any static or dynamic mixers in the line. In another aspect of this embodiment, the base feed line feeds into a dynamic or a static mixer between steps (b) and (c) above. In another aspect of this embodiment, the base feed line feeds into a dynamic or a static mixer between steps (c) and (d) above. In yet another aspect of this embodiment, the base feed line feeds into a dynamic or a static mixer between steps (b) and (c) above, and again between steps (c) and (d) above. Optionally, the liquid silicone rubber base of step (a) may further comprise: (6) at least one liquid injection molding inhibitor. Preferably, the optional at least one liquid injection molding inhibitor of step (a) is present in a trace amount.

In another embodiment, a method of producing a molded silicone rubber product is disclosed comprising: (a) feeding into a base feed line a liquid silicone rubber base comprising: (1) at least one vinyl siloxane polymer; (2) at least one hydride crosslinker; and (3) at least one liquid injection molding inhibitor, wherein said base feed line feeds into the barrel of an injection molding machine; (b) feeding into said base feed line containing said liquid silicone rubber base a catalyst master batch comprising: (1) at least one catalyst; and (2) at least one vinyl siloxane polymer; (c) transferring said liquid silicone rubber base and said catalyst master batch into the barrel of the injection molding machine via the base feed line; (d) operating said injection molding machine, thereby mixing said liquid silicone rubber base and said catalyst master batch; and (d) curing said mixed liquid silicone rubber base and catalyst master batch by heating. In one aspect of this embodiment, the base feed line feeds into the injection molding machine without any static or dynamic mixers in the line. In another aspect of this embodiment, the base feed line feeds into a dynamic or a static mixer between steps (b) and (c) above.

In another embodiment, a method of producing a molded silicone rubber product is disclosed comprising: (a) feeding into a base feed line a liquid silicone rubber base comprising: (1) at least one vinyl siloxane polymer; (2) at least one hydride crosslinker; (3) at least one filler; and (4) at least one liquid injection molding inhibitor, wherein said base feed line feeds into the barrel of an injection molding machine; (b) feeding into said base feed line containing said liquid silicone rubber base a catalyst master batch comprising: (1) at least one catalyst; and (2) at least one vinyl siloxane polymer; (c) transferring said liquid silicone rubber base and said catalyst master batch into the barrel of the injection molding machine via the base feed line; (d) operating said injection molding machine, thereby mixing said liquid silicone rubber base and said catalyst master batch; and (e) curing said mixed liquid silicone rubber base and catalyst master batch by heating. In one aspect of this embodiment, the base feed line feeds into the injection molding machine without any static or dynamic mixers in the line. In another aspect of this embodiment, the base feed line feeds into a dynamic or a static mixer between steps (b) and (c) above.

In a further embodiment, a method of producing a molded silicone rubber product is disclosed comprising: (a) feeding into a base feed line a liquid silicone rubber base comprising: (1) at least one vinyl siloxane polymer; (2) at least one hydride crosslinker; (3) at least one filler; (4) at least one pre-structuring compound; and (5) at least one liquid injection molding inhibitor, wherein said base feed line feeds into the barrel of an injection molding machine; (b) feeding into said base feed line containing said liquid silicone rubber base a catalyst master batch comprising: (1) at least one catalyst; and (2) at least one vinyl siloxane polymer; (c) transferring said liquid silicone rubber base and said catalyst master batch into the barrel of the injection molding machine via the base feed line; (d) operating said injection molding machine, thereby mixing said liquid silicone rubber base and said catalyst master batch; and (e) curing said mixed liquid silicone rubber base and catalyst master batch by heating. In one aspect of this embodiment, the base feed line feeds into the injection molding machine without any static or dynamic mixers in the line. In another aspect of this embodiment, the base feed line feeds into a dynamic or a static mixer between steps (b) and (c) above.

In yet another embodiment, a method of producing a molded silicone rubber product is disclosed comprising: (a) feeding into a base feed line a liquid silicone rubber base comprising: (1) at least one vinyl siloxane polymer; (2) at least one hydride crosslinker; (3) at least one filler; (4) at least one pre-structuring compound; (5) at least one silicone release agent; and (6) at least one liquid injection molding inhibitor, wherein said base feed line feeds into the barrel of an injection molding machine; (b) feeding into said base feed line containing said liquid silicone rubber base a catalyst master batch comprising: (1) at least one catalyst; and (2) at least one vinyl siloxane polymer; (c) transferring said liquid silicone rubber base and said catalyst master batch into the barrel of the injection molding machine via the base feed line; (d) operating said injection molding machine, thereby mixing said liquid silicone rubber base and said catalyst master batch; and (e) curing said mixed liquid silicone rubber base and catalyst master batch by heating. In one aspect of this embodiment, the base feed line feeds into the injection molding machine without any static or dynamic mixers in the line. In another aspect of this embodiment, the base feed line feeds into a dynamic or a static mixer between steps (b) and (c) above.

In an alternate embodiment, a liquid silicone rubber base is provided comprising at least one vinyl siloxane polymer and at least one hydride crosslinker.

In an alternate embodiment, a liquid silicone rubber base is provided comprising at least one vinyl siloxane polymer, at least one hydride crosslinker, and at least one liquid injection molding inhibitor.

In an alternate embodiment, a liquid silicone rubber base is provided comprising at least one vinyl siloxane polymer, at least one hydride crosslinker, at least one liquid injection molding inhibitor, and at least one filler.

In an alternate embodiment, a liquid silicone rubber base is provided comprising at least one vinyl siloxane polymer, at least one hydride crosslinker, at least one liquid injection molding inhibitor, at least one filler, and at least one pre-structuring compound.

In an alternate embodiment, a liquid silicone rubber base is provided comprising at least one vinyl siloxane polymer, at least one hydride crosslinker, at least one liquid injection molding inhibitor, at least one filler, at least one pre-structuring compound, and at least one silicone release agent.

In an alternate embodiment, a liquid silicone rubber base is provided comprising at least one vinyl siloxane polymer, at least one hydride crosslinker, at least one filler, at least one pre-structuring compound, and at least one silicone release agent.

In an alternate embodiment, a liquid silicone rubber base is provided comprising at least one vinyl siloxane polymer, at least one hydride crosslinker, at least one filler, and at least one pre-structuring compound.

In an alternate embodiment, a liquid silicone rubber base is provided comprising at least one vinyl siloxane polymer, at least one hydride crosslinker, and at least one filler.

In an alternate embodiment, a liquid silicone rubber base is provided comprising at least one vinyl siloxane polymer, at least one hydride crosslinker, at least one filler, at least one pre-structuring compound, at least one release agent; and optionally, at least one injection molding inhibitor, but no catalyst. In one aspect of this embodiment: a) the at least one vinyl siloxane polymer is selected from the group consisting of: Formula I-3, Formula I-4, Formula I-5, Formula I-6, and Formula I-7, as defined below, and combinations thereof, wherein: the radical R are, independently, selected from the group consisting of monovalent hydrocarbon radicals and halogenated monovalent hydrocarbon radicals; the radical $R^1$ are, independently, selected from the group consisting of phenyl, lower alkenyl of 2 to 8 carbon atoms, lower alkyl of 1 to 8 carbon atoms and mononuclear aryl radicals; the radical $R^2$ are, independently, selected from the group consisting of an alkyl radical, a mononuclear aryl radical, a lower alkyl radical of 1 to 8 carbon atoms, a phenyl radical, lower alkenyl of 2 to 8 carbon atoms, and a vinyl group; the radical R" are, independently, selected from the same groups as the radical $R^1$; Vi denotes vinyl; m is an integer from about 100 to about 10,000; n is an integer from about 100 to about 400; o is an integer from about 2 to about 8; p is an integer from about 100 to about 200; q is an integer from about 5 to about 15; w is an integer from about 0 to about 500; x is an integer from about 100 to about 10,000; y is an integer from about 0 to about 300; and z is an integer from about 0 to about 200; b) the at least one hydride crosslinker is selected from the group consisting of: Formula II-3, Formula II-4, Formula II-5, Formula II-6, and Formula II-7, as defined below, and combinations thereof, wherein: each $R^4$ is selected, independently, from the group consisting of hydrogen, monovalent hydrocarbon radicals, and halogenated monovalent hydrocarbon radicals; each $R^5$ radical is selected, independently, from the group consisting of monovalent hydrocarbon radicals, and halogenated monovalent hydrocarbon radicals; s is an integer from about 1 to about 1000; t is an integer from about 5 to about 200; u is an integer from about 14 to about 30; v is an integer from about 12 to about 21; w is an integer from about 2 to about 8; x is an integer from about 3 to about 9; y is an integer from about 5 to about 15; M is monofunctional trimethylsilyl or $(CH_3)_3SiO_{1/2}$; H is hydrogen; and Q is tetrafunctional silicon dioxide or $SiO_{4/2}$; c) the at least one filler is in situ treated fumed silica treated with hexamethyldisilazane and tetramethyldivinyldisilazane; d) the at least one pre-structuring compound has the formula: Formula X, wherein R is selected from the group consisting of monovalent hydrocarbon radicals, and halogenated monovalent hydrocarbon radicals; and n is an integer from about 0 to about 12, e) the at least one release agent has the formula $M_xQ^{OH}$, wherein x is an integer from about 1 to about 3, and f) the optional at least one liquid injection molding inhibitor is present at a concentration of about 0.0 parts per 100 to about 1.4 parts per 100, and is selected from the group consisting of: Formula III, Formula VI, and combinations thereof, wherein: i) $R^1$ has the formula of Formula IV; $R^2$ is selected from the group consisting of Formula IV, hydrogen, triorganosilyl radicals, siloxanes, and Formula V; iii) $R^3$ is selected from the group consisting of: of divalent hydrocarbonradicals consisting of linear or branched alkyl radicals having from about 1 to about 10 carbon atoms; linear or branched alkenyl radicals having from about 1 to about 10 carbon atoms; linear or branched alkynyl radicals having from about 1 to about 10 carbon atoms; cycloalklyl radicals having from about 3 to about 12 carbon atoms; cycloalkenyl radicals having from about 3 to about 12 carbon atoms; cycloalkynyl radicals having from about 8 to about 16 carbon atoms; fluorinated linear or branched alkyl radicals having from about 1 to about 10 carbon atoms; chlorinated linear or branched alkyl radicals having from about 1 to about 10 carbon atoms; brominated linear or branched alkyl radicals having from about 1 to about 10 carbon atoms; fluorinated linear or branched alkenyl radicals having from about 1 to about 10 carbon atoms; chlorinated linear or branched alkenyl radicals having from about 1 to about 10 carbon atoms; brominated linear or branched alkenyl radicals having from about 1 to about 10 carbon atoms; fluorinated linear or branched alkynyl radicals having from about 1 to about 10 carbon atoms; chlorinated linear or branched alkynyl radicals having from about 1 to about 10 carbon atoms; brominated linear or branched alkynyl radicals having from about 1 to about 10 carbon atoms; hydrocarbonoxy radicals containing at least two carbon atoms; fluorinated hydrocarbonoxy radicals containing at least two carbon atoms; chlorinated hydrocarbonoxy radicals containing at least two carbon atoms; brominated hydrocarbonoxy radicals containing at least two carbon atoms; aryl radicals; linear or branched alkyl aryl radicals; fluorinated aryl radicals; chlorinated aryl radicals; brominated aryl radicals; fluorinated linear or branched alkyl-, alkenyl-, or alkynyl aryl radicals; chlorinated linear or branched alkyl-, alkenyl-, or alkynyl aryl radicals; and brominated linear or branched alkyl-, alkenyl-, or alkynyl aryl radicals; iv) $R^4$ is selected from the group of monovalent radicals consisting of: hydrogen, linear or branched alkyl radicals having from about 1 to about 10 carbon atoms; linear or branched alkenyl radicals having from about 1 to about 10 carbon atoms; linear or branched alkynyl radicals having from about 1 to about 10 carbon atoms; cycloalklyl radicals having from about 3 to about 12 carbon atoms; cycloalkenyl radicals having from about 3 to about 12 carbon atoms; cycloalkynyl radicals having from about 8 to about 16 carbon atoms; fluorinated linear or branched alkyl radicals having from about 1 to about 10 carbon atoms; chlorinated linear or branched alkyl radicals having from about 1 to about 10 carbon atoms; brominated linear or branched alkyl radicals having from about 1 to about 10 carbon atoms; fluorinated linear or branched alkenyl radicals having from about 1 to about 10 carbon atoms; chlorinated linear or branched alkenyl radicals having from about 1 to about 10 carbon atoms; brominated linear or branched alkenyl radicals having from about 1 to about 10 carbon atoms; fluorinated linear or branched alkynyl radicals having from about 1 to about 10 carbon atoms; chlorinated linear or branched alkynyl radicals having from about 1 to about 10 carbon atoms; brominated linear or branched alkynyl radicals having from about 1 to about 10 carbon atoms; hydrocarbonoxy radicals containing at least two carbon atoms; fluorinated hydrocarbonoxy radicals containing at least two carbon atoms; chlorinated hydrocarbonoxy radicals containing at least two carbon atoms; brominated hydrocarbonoxy radicals containing at least two carbon atoms aryl radicals; linear or branched alkyl aryl radicals; fluorinated aryl radicals; chlorinated aryl radicals; brominated aryl radicals; fluorinated linear or branched alkyl-, alkenyl-, or alkynyl aryl radicals; chlorinated linear or branched alkyl-, alkenyl-, or alkynyl aryl radicals; brominated linear or branched alkyl-, alkenyl-, or alkynyl aryl radicals; and triorganosilyl radicals; and v) R is selected from the group consisting of: hydrogen; alkyl; phenyl; and $C_xH_y$, where x is an integer from about 2 to about 10, and y is an integer from about 4 to about 21. Preferably, at least three $R^4$ groups of Formula II-3—if used at b), above—are hydrogen.

In an alternate embodiment, a catalyst master batch is provided comprising at least one catalyst and at least one vinyl siloxane polymer.

In an alternate embodiment, an inhibitor master batch is provided comprising at least one liquid injection molding inhibitor and at least one vinyl siloxane polymer.

In an alternate embodiment, a molded silicone rubber article is provided, produced by using a liquid silicone rubber base comprising: at least one vinyl siloxane polymer; at least one hydride crosslinker; at least one filler; at least one pre-structuring compound; at least one release agent; and optionally, at least one injection molding inhibitor; but no catalyst.

Other processes and products in accordance with the process are provided in the detailed description and claims that follow below. Additional objects, features, and advantages will be sent forth in the description that follows, and in part, will be obvious from the description, or may be learned by practice of the invention. The objects, features, and advantages may be realized and obtained by means of the instrumentalities and combination particularly pointed out in the appended claims.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Figure 1:
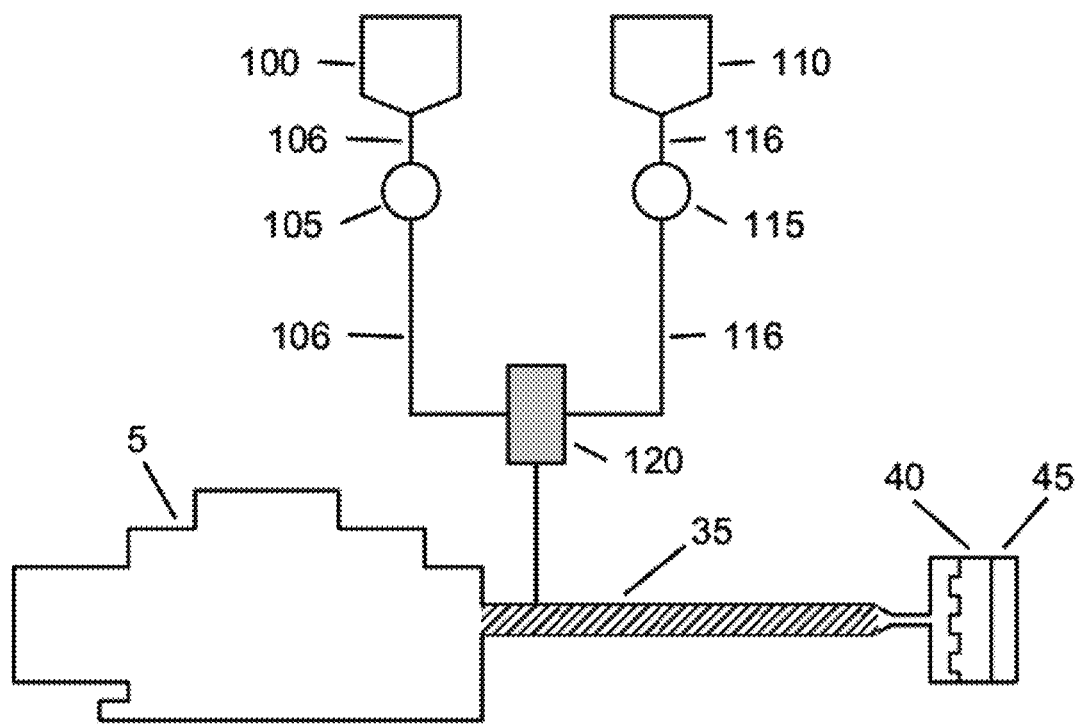
FIG. 1 is a schematic representation of a standard two-part liquid silicone rubber process of the prior art, for producing a molded silicone rubber product, wherein components A and B are mixed in a static or dynamic mixer before being introduced into the injection molding machine.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Disclosed is a novel process for the preparation of molded silicone rubber products.

Generally, the process uses a single LSR base comprising at least one vinyl siloxane polymer, at least one silicone hydride cross linker, and (optionally) at least one liquid injection molding inhibitor. Other optional base components may include additional vinyl siloxane polymers, fillers, releasing agents, pre-structuring compounds, and additional silicone hydride crosslinkers. Separate from the base is a mixture of at least one catalyst and at least one vinyl siloxane polymers (the catalyst master batch), and a mixture of at least one inhibitor and at least one vinyl siloxane polymer (the inhibitor master batch). One benefit afforded by a separate inhibitor master batch is improved control over the curing time when dealing with different size injection molded parts. Optionally, a portion of the vinyl siloxane polymers may be removed from the base and separately added (e.g., added to the inhibitor as a component of the inhibitor master batch or as a component of the catalyst master batch). This provides even greater control over the curing time and cured part physical properties. The single LSR base may optionally comprise a trace amount of at least one injection molding inhibitor, or about 0.0125 parts per 100 in the LSR base.

The single LSR base can be fed into a liquid injection molding machine, along with the catalyst master batch (catalyst/vinyl siloxane mixture). Components not present in the base (e.g., the catalyst and the inhibitor) can be added separately to the liquid injection molding machine (e.g., directly into the barrel) or injected into the base feed line (e.g., the line containing the LSR base, and connecting the source of LSR base to the injection molding machine). The single LSR base may comprise at least one vinyl siloxane polymer, at least one silicone hydride cross linker, and (optionally) at least one liquid injection molding inhibitor. In one embodiment, the at least one vinyl siloxane polymer comprises at least one polyorganosiloxane (I) containing, per molecule, at least two $C_2$-$C_6$ alkenyl groups linked to silicon. The polyorganosiloxane (I) is one of the essential constituents of the single LSR base.

Advantageously, it is a product comprising:
(i) siloxyl units of formula:

Formula I-1 in which:
(a) the symbols $R^1$ represent an alkenyl group, preferably vinyl or allyl,
(b) the symbols Z, which may be identical or different, each represent a monovalent hydrocarbon-based group, free of unfavourable action on the activity of the catalyst and chosen from alkyl groups containing from 1 to 8 carbon atoms inclusive, optionally substituted with at least one halogen atom, and also from aryl groups,
(c) a is 1 or 2, b is 0, 1 or 2 and the sum a+b is equal to 1, 2 or 3, and optionally
(ii) other siloxyl units of formula:

 Formula I-2 in which Z has the same meaning as above and c is 0, 1, 2 or 3.

The polyorganosiloxane (I) may be formed solely from units of Formula I-1 or may contain, in addition, units of Formula I-2. Similarly, it may have a linear or branched structure. Z is generally chosen from methyl, ethyl and phenyl radicals, 60 mol % (or in numerical terms) at least of the radicals Z being methyl radicals. Examples of siloxyl units of formula (I-1) are vinyldimethylsiloxyl, vinylphenylmethylsiloxyl, vinylmethylsiloxyl and vinylsiloxyl units.

Examples of siloxyl units of Formula I-2 are the units $SiO_{4/2}$, dimethylsiloxyl, methylphenylsiloxyl, diphenylsiloxyl, methylsiloxyl and phenylsiloxyl. Examples of polyorganosiloxanes (I) are for instance: dimethylpolysiloxanes containing dimethylvinylsilyl end groups, (methylvinyl)(dimethyl)polysiloxane copolymers containing trimethylsilyl end groups and (methylvinyl)(dimethyl)polysiloxane copolymers containing dimethylvinylsilyl end groups.

Other examples of polyorganosiloxanes (I) may include the following:

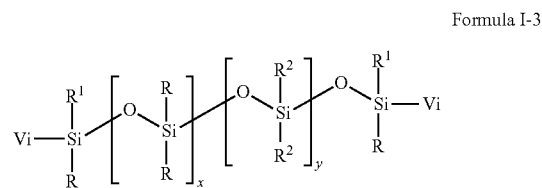

Formula I-3

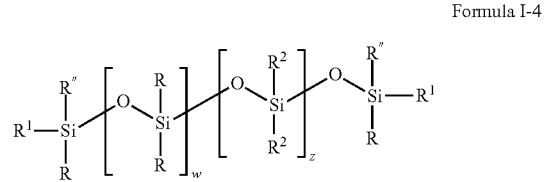

Formula I-4 where Vi stands for vinyl in Formula I-3.

The radical R in Formulas I-3 and I-4 is selected from monovalent hydrocarbon radicals and halogenated monovalent hydrocarbon radicals, that is, radicals normally associates as substituent groups for silicone polysiloxanes. Thus, the radical R in the vinyl containing polysiloxanes of Formula I-3 and I-4 may be individually selected from the class consisting of mononuclear and binuclear aryl radicals such as, phenyl, tolyl, xylyl, napthyl; halogenated mononuclear and binuclear aryl radicals such as, chlorophenyl, chloronapthyl; mononecular aryl lower alkyl radicals having from 1 to 8 carbon atoms per alkyl group such as benzyl, phenyl; lower alkyl radicals having from 1 to 8 carbon atoms such as methyl, ethyl, propyl, butyl, pentyl, hexyl, octyl; lower alkenyl radicals having from 2 to 8 carbon atoms such as, vinyl, allyl, and 1-propenyl; halo lower alkyl radicals having from 1 to 8 carbon atoms such as chloropropyl, trifluoropropyl, and cycloalkyl radicals such as, cyclobutyl, cyclopentyl, and cyclohexyl. Preferably, the R radical in the vinyl containing polysiloxanes of Formula I-3 and I-4 is a lower alkyl radical of 1 to 8 carbon atoms such as methyl, ethyl, and phenyl. The R radicals in Formula I-3 and I-4 can be the same or different.

The radical $R^1$ in Formula I-3 and I-4 is selected from the class consisting of lower alkenyl of 2 to 8 carbon atoms, lower alkyl of 1 to 8 carbon atoms and mononecular aryl radicals. $R^1$ can also be a phenyl. Preferably, the radical $R^1$ in Formula I-3 and I-4 is methyl. The $R^1$ radicals in Formula I-3 and I-4 can be the same or different.

The radical $R^2$ in Formula I-3 and I-4 is preferably an alkyl radical or a mononuclear aryl radical and is more preferably a lower alkyl radical of 1 to 8 carbon atoms or a phenyl radical or from the class consisting of lower alkenyl of 2 to 8 carbon atoms. The $R^2$ radical can also be a vinyl group. The two $R^2$ radicals can be the same or different.

The R" radical in Formula 1-4 is selected from the same groups as the $R^1$ radical, that is, groups selected from the class consisting of alkyl, aryl, and alkenyl radicals and the R" radical is preferably selected from the class consisting of lower alkyl radicals of 1 to 8 carbon atoms, phenyl radicals and lower alkenyl radicals of 2 to 8 carbon atoms. Most preferably, the R" radical is selected from methyl, ethyl, propyl, vinyl, and allyl. The R" radicals can be the same or different.

Formula I-3 vinyl siloxane polymers may have a viscosity of from about 5000 centipoise to about 1,000,000 centipoise at 25° C. In Formula 1-3 vinyl siloxane polymers, x varies from about 100 to about 10,000 and y varies from about 0 to about 300. More preferably, x varies from about 500 to about 2000 and y varies from about 0 to about 300.

Formula I-4 vinyl siloxane polymers may have a viscosity of from about 50 centipoise to about 5,000 centipoise, and more preferably from about 50 centipoise to about 2,000 centipoise at 25° C. In Formula I-4, w generally varies from about 0 to about 500 and z varies from about 0 to about 200. More preferably, w varies from about 50 to about 300 and z varies from about 0 to about 100.

Preferably, the vinyl siloxane polymers are 5,000 to 1,000,000 centipoise dimethylvinyl terminated polydimethlysiloxane polymer of Formula I-5; 500 to 100,000 centipoise trimethyl terminatedmethylvinyl dimethylsiloxane copolymer of Formula I-6; and 100 to 100,000 centipoise dimethylvinyl terminated methylvinyl, dimethylsiloxane copolymer of Formula I-7. More preferably, the vinyl siloxane polymers are 40,000 to 100,000 centipoise dimethylvinyl terminated polydimethlysiloxane polymer of Formula I-5; about 1000 centipoise trimethyl terminated, methylvinyl dimethylsiloxane copolymer of Formula I-6; and about 400 centipoise dimethylvinyl terminated methylvinyl dimethylsiloxane copolymer of Formula I-7, as shown below:

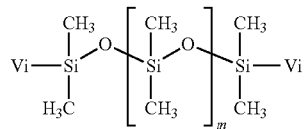

Formula I-5

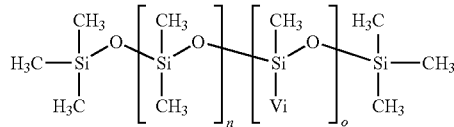

Formula I-6

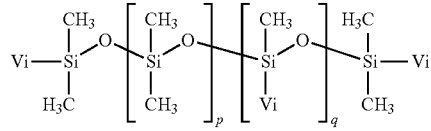

Formula I-7 where Vi stands for vinyl, and m varies from about 100 to 10,000 and preferably 500 to 2000; n varies from about 100 to 400, and preferably 220 to 280 o varies from about 2.0 to 8.0, and preferably 3.0 to 5.0; p varies from about 100 to 200, and preferably 130 to 155; and q varies from about 5.0 to 15.0, and preferably 8.0 to 12.0.

The at least one silicone hydride cross linker may include hydrogen-containing silanes, hydrogen-containing siloxanes, hydrogen-containing polysiloxanes, and mixtures thereof. In one embodiment, the silicone hydride crosslinkers may be a polysiloxane resin having the formula $H(R^3)_2SiO_{1/2}$ units and $SiO_2$ units where the ratio of the monofunctional units to tetrafunctional units may vary from 0.5:1 to 10:1, and is preferably about 2:1. The hydroxyl and alkoxy content of such a resin is preferably less than 0.5 weight percent based on the weight of the resin. The $R^3$ radical is selected from the class consisting of hydrogen, monovalent hydrocarbon radicals, and halogenated monovalent hydrocarbon radicals. Thus, the radical $R^3$ may be selected from the same radicals as discussed above with respect to the R radical appearing in Formulas I-3 and I-4. Preferably, the $R^3$ radical is a lower alkyl radical of 1 to 8 carbons such as, methyl and ethyl.

In another embodiment, when the at least one silicone hydride cross linker is chosen from a hydrogen containing polysiloxanes (II) it may comprise siloxyl units of formula:

$$H_d Z_e SiO \frac{4-(d+e)}{2}$$

Formula II-1 in which:
(i) the groups L, which may be identical or different, each represent a monovalent hydrocarbon-based group, free of unfavourable action on the activity of the catalyst and chosen, preferably, from an alkyl group containing from 1 to 8 carbon atoms inclusive, optionally substituted with at least one halogen atom, advantageously from methyl, ethyl, propyl and 3,3,3-trifluoropropyl groups, an aryl group, and advantageously a xylyl, tolyl or phenyl radical;
(ii) d is 1 or 2, e is 0, 1 or 2, the sum d+e is equal to 1, 2 or 3; and
(iii) optionally, at least some of the other units being units of mean formula:

$$L_g SiO \frac{4-g}{2}$$

Formula II-2 in which the groups L have the same meaning as above and g is equal to 0, 1, 2 or 3.

The polyorganosiloxane (II) may be formed solely from units of formula (II-1) or may also comprise units of Formula II-2. The polyorganosiloxane (II) may have a linear or branched, structure. The group L has the same meaning as the group Z above.

Examples of units of Formula II-1 are $H(CH_3)_2SiO_{1/2}$, $HCH_3SiO_{2/2}$ and $H(C_6H_5)SiO_{2/2}$.

The examples of units of Formula II-2 are the same as those given above for the units of Formula I-2.

Examples of polyorganosiloxanes (II) are for instance:
(i) dimethylpolysiloxanes containing hydrogenodimethylsilyl end groups;
(ii) copolymers containing (dimethyl)(hydrogenomethyl) polysiloxane units containing trimethylsilyl end groups;
(iii) copolymers containing (dimethyl)(hydrogenomethyl) polysiloxane units containing hydrogenodimethylsilyl end groups; and
(iv) hydrogenomethylpolysiloxanes containing trimethylsilyl end groups.

In a preferred embodiment the at least one silicone hydride cross linker may have the following formula:

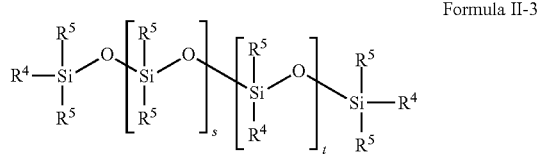
Formula II-3 wherein each $R^4$ is selected, independently, from the class consisting of hydrogen, monovalent hydrocarbon radicals and halogenated monovalent hydrocarbon radicals, or the same radicals as the R radicals that were defined above with respect to the vinyl polysiloxanes of Formulas I-3 and I-4. Preferably, at least three $R^4$ groups of Formula II-3 are hydrogen. Each $R^5$ radical is selected, independently, from the class consisting of monovalent hydrocarbon radicals, halogenated monovalent hydrocarbon radicals, or the same radicals that were defined with respect to the R radical in connection with the definition of the compounds of Formulas I-3 and I-4. The $R^4$ radicals can be the same or different. The $R^5$ radicals can be the same or different. In Formula II-3, s varies between about 1 to about 1000 and t varies from about 5 to about 200. More preferably, s varies from about 10 to about 100, and t varies from about 5 to about 200.

In other preferred embodiments, the at least one silicone hydride crosslinker may have the following formulas:

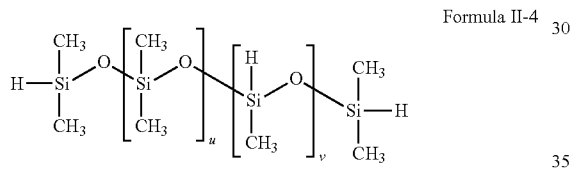
Formula II-4

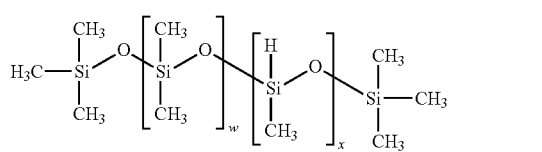
Formula II-5

Another type of hydride polymer used to extend the polysiloxane chain length for the purpose of increasing elongation and decreasing modulus has the following formula:

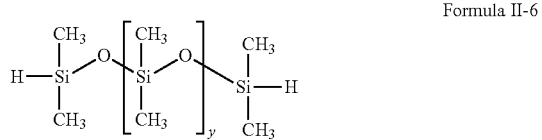
Formula II-6

In Formula II-4, u ranges from about 14 to about 30, preferably 19 to 23, most preferred c is 21; and v ranges from about 12 to about 21, preferably 15 to 18, most preferred 16.

In Formula II-5, w ranges from about 2 to about 8, preferably 3 to 6, most preferred c is 5; and x ranges from about 3 to about 9, preferably 5 to 7, most preferred 6.

In Formula II-6, y ranges from about 5 to about 15, preferably 7 to 10, most preferred 8.

In another preferred embodiment, the at least one silicone hydride crosslinker may have the following formula:

$M_2^H Q$  Formula II-7 which is a dimethyl hydrogen stopped Q hydride cross linker, where M and Q refer to the nomenclature explained in the research monograph by H. A. Liebhafsky, "Silicones Under the Monogram," published by Wiley-Interscience division of John Wiley and Sons, New York (publication date 1978) at pages 99 and following, and which is hereby incorporated by reference in its entirety. In brief, M is monofunctional trimethylsilyl or $(CH_3)_3SiO_{1/2}$; H is hydrogen, and Q is tetrafunctional silicon dioxide or $SiO_{4/2}$.

The preparation of the polysiloxanes of Formulas I-1-I-7 is well known in the art. U.S. Pat. No. 2,406,621, which is hereby incorporated by reference in its entirety, describes a general method for preparing polysiloxanes. The hydrogen containing siloxane resin containing monofunction units and tetrafunctional units may be produced by methods well known in the art, such as U.S. Pat. No. 2,857,356, which is hereby incorporated by reference in its entirety. The hydride cross linkers of Formulas II-1-II-7 may be produced by methods well known in the art, such as, U.S. Pat. Nos. 3,697,473 and 3,989,688, which are hereby incorporated by reference in their entirety.

The at least one injection molding inhibitor can be any compound that slows down the curing time of an LSR process. Preferably, the inhibitors are selected from the class consisting of acetylenic alcohols as described in U.S. Pat. No. 3,445,420, which is hereby incorporated by reference in its entirety. Further, the at least one injection molding inhibitor may also have the formula:

Formula III wherein $R^1$ has the formula:

Formula IV wherein $R^3$ is selected from the group of divalent hydrocarbonradicals consisting of linear or branched alkyl radicals having from 1 to about 10 carbon atoms, linear or branched alkenyl radicals having from 1 to about 10 carbon atoms, linear or branched alkynyl radicals having from 1 to about 10 carbon atoms, cycloalklyl radicals having from 3 to about 12 carbon atoms, cycloalkenyl radicals having from about 3 to 12 carbon atoms, cycloalkynyl radicals having from about 8 to about 16 carbon atoms, fluorinated linear or branched alkyl radicals having from 1 to about 10 carbon atoms, chlorinated linear or branched alkyl radicals having from 1 to about 10 carbon atoms, brominated linear or branched alkyl radicals having from 1 to about 10 carbon atoms, fluorinated linear or branched alkenyl radicals having from 1 to about 10 carbon atoms, chlorinated linear or branched alkenyl radicals having from 1 to about 10 carbon atoms, brominated linear or branched alkenyl radicals having from 1 to about 10 carbon atoms, fluorinated linear or branched alkynyl radicals having from 1 to about 10 carbon atoms, chlorinated linear or branched alkynyl radicals having from 1 to about 10 carbon atoms, brominated linear or branched alkynyl radicals having from 1 to about 10 carbon atoms, hydrocarbonoxy radicals containing at least two carbon atoms, fluorinated hydrocarbonoxy radicals containing at least two carbon atoms, chlorinated hydrocarbonoxy radicals containing at least two carbon atoms, brominated hydrocarbonoxy radicals containing at least two carbon atoms, aryl radicals, linear or branched alkyl aryl radicals, fluorinated aryl radicals, chlorinated aryl radicals, brominated aryl radicals; fluorinated linear or branched alkyl-, alkenyl-, or alkynyl aryl radicals; chlorinated linear or branched alkyl-, alkenyl-, or alkynyl aryl radicals; and brominated linear or branched alkyl-, alkenyl-, or alkynyl aryl radicals; and wherein $R^4$ is selected from the group of monovalent radicals consisting of hydrogen, linear or branched alkyl radicals having from 1 to about 10 carbon atoms, linear or branched alkenyl radicals having from 1 to about 10 carbon atoms, linear or branched alkynyl radicals having from 1 to about 10 carbon atoms, cycloalklyl radicals having from 3 to about 12 carbon atoms, cycloalkenyl radicals having from about 3 to 12 carbon atoms, cycloalkynyl radicals having from about 8 to about 16 carbon atoms, fluorinated linear or branched alkyl radicals having from 1 to about 10 carbon atoms, chlorinated linear or branched alkyl radicals having from 1 to about 10 carbon atoms, brominated linear or branched alkyl radicals having from 1 to about 10 carbon atoms, fluorinated linear or branched alkenyl radicals having from 1 to about 10 carbon atoms, chlorinated linear or branched alkenyl radicals having from 1 to about 10 carbon atoms, brominated linear or branched alkenyl radicals having from 1 to about 10 carbon atoms, fluorinated linear or branched alkynyl radicals having from 1 to about 10 carbon atoms, chlorinated linear or branched alkynyl radicals having from 1 to about 10 carbon atoms, brominated linear or branched alkynyl radicals having from 1 to about 10 carbon atoms, hydrocarbonoxy radicals containing at least two carbon atoms, fluorinated hydrocarbonoxy radicals containing at least two carbon atoms, chlorinated hydrocarbonoxy radicals containing at least two carbon atoms, brominated hydrocarbonoxy radicals containing at least two carbon atoms aryl radicals, linear or branched alkyl aryl radicals, fluorinated aryl radicals, chlorinated aryl radicals, brominated aryl radicals; fluorinated linear or branched alkyl-, alkenyl-, or alkynyl aryl radicals; chlorinated linear or branched alkyl-, alkenyl-, or alkynyl aryl radicals; brominated linear or branched alkyl-, alkenyl-, or alkynyl aryl radicals; and triorganosilyl radicals and wherein $R^2$ may be $R^1$ or selected from the group consisting of hydrogen, triorganosilyl radicals, and siloxanes wherein the structural geometry of the compound around the double bond may be either cis or trans.

More preferably, the at least one injection molding inhibitor has the following formula:

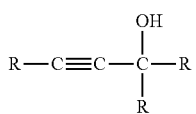

Formula V where R may be hydrogen, alkyl, or a phenyl. R may also have the following formula: $C_xH_y$, where x ranges from about 2 to about 10, and y ranges from about 4 to about 21.

Most preferably, the at least one injection molding inhibitor is an ethynyl cyclohexanol of the following formula:

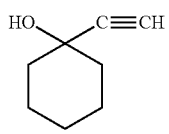

Formula VI

The at least one catalyst can be any transition metal containing compound that facilitates a reaction between the vinyl functional group on the vinyl polysiloxane polymers and the hydrogen functional group on the hydride cross linkers. Typical transition metal catalysts are platinum, rhodium, ruthenium, palladium, and iridium. Preferably, the at least one catalyst is a platinum complex (a "platinum catalyst" or "platinum compound"). When optical clarity in the finished molded part is required, the platinum compound can be selected from those having the formula $(PtCl_2Olefin)_2$ and $H(PtCl_3Olefin)$ as described in U.S. Pat. No. 3,159,601, which is hereby incorporated by reference in its entirety. The olefin in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, and cycloheptene.

In another embodiment, the platinum-containing material is platinum chloride cyclopropane complex $(PtCl_2C_3H_6)$ described in U.S. Pat. No. 3,159,662, which is hereby incorporated by reference in its entirety.

In yet a further embodiment, the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972, which is hereby incorporated by reference in its entirety.

In yet another embodiment, the platinum catalyst is a platinum methylvinyl complex as described in U.S. Pat. Nos. 3,715,334; 3,775,452; and 3,814,730, each of which are hereby incorporated by reference in their entirety, formed via a reaction between $H_2PtCl_6+6H_2O+$ dimethyl vinyl terminated polydimethlysiloxane polymer. Preferably, the platinum compound catalyst, which contains about 10% platinum, is diluted to about 1% to about 0.1% platinum methylvinyl complex in about 99% to about 99.9% dimethylvinyl terminated polydimethlysiloxane polymer.

Optional LSR base components may include at least one filler, at least one releasing agent, and at least one pre-structuring compound. Fillers are used to obtain high tensile strength molded products. Examples of fillers include: titanium dioxide, lithopone, zinc oxide, zirconium silicate, silica aerogel, iron oxide, diatomaceous earth, calcium carbonate, fumed silica, silazane treated silica, precipitated silica, organosiloxane and cyclic organosiloxane treated silica, glass fibers, magnesium oxide, chromic oxide, zirconium oxide, aluminum oxide, alpha quartz, carbon black, calcined clay, asbestos, carbon, graphite, cork, cotton, and synthetic fibers.

The preferred fillers may be either fumed silica or a precipitated silica that may have been surfaced treated. In one method of surface treatment, the fumed silica or precipitated silica is exposed to cyclic organopolysiloxanes under heat and pressure. An additional method of treating fillers is one in which the silica is exposed to siloxanes or silanes in the presence of an amine compound.

Another method of surface treating silica fillers employs methyl silane or silazane surface treating agents. Methylsilane or silazane surface treated fumed or precipitated silica fillers exhibit the property of producing pumpable silicone compounds and also do not overly increase the low viscosity of the uncured liquid precursor silicone composition. After curing, silazane treated silicas impart an improved tear strength to the cured elastomer. U.S. Pat. Nos. 3,365,743 and 3,847,848 disclose such methods, and are hereby incorporated by reference in their entirety.

More preferred silica fillers are in situ formed fumed silica with a surface area between about 100 $m^2$ per gram to about 600 $m^2$ per gram, and most preferably between about 200 $m^2$ per gram to about 400 $m^2$ per gram. In situ treated fumed silica occurs when the silanols on the surface of the fumed silica are capped with a silicon atom containing alkyl, aryl, or alkenyl pendant groups while being compounded with the polymer in the mixer. This process can utilize hexamethyldisilazane, tetramethyldivinyldisilazane or a suitable silanol capping agent known in the art, such as trimethylsilanol and dimethylvinylsilanol to treat the filler.

The fumed silica can have a surface with silicon atoms to which are bonded organosiloxane groups and hydroxide groups. The organosiloxane groups bonded to the silica surface may be

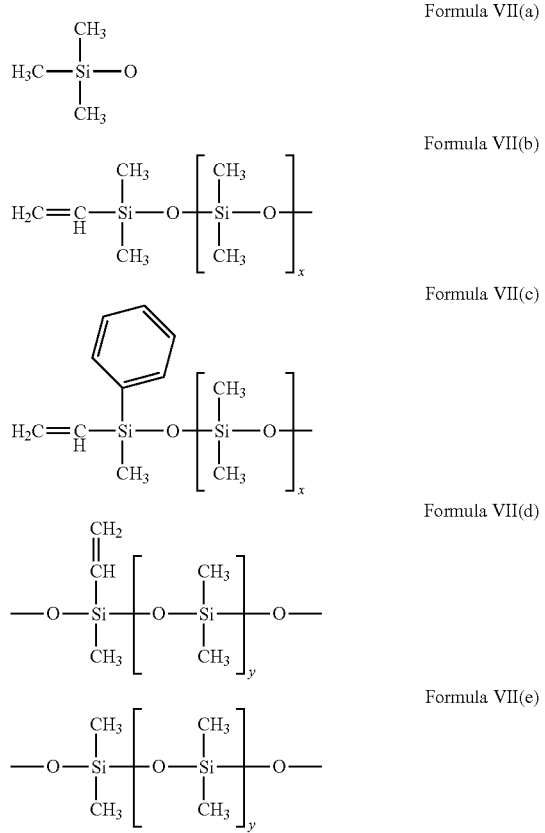

where x ranges from about 0 to about 20 and y ranges from about 1 to about 10. The organosiloxane groups are present on the silica in an amount sufficient to provide from about 0.05 to about 0.32 percent by weight vinyl radical bases on the weight of the silica, and are present in a mole ratio such that there is from about 7 to about 50 moles of organosiloxane group from Formula VII(a) for each mole of organosiloxane group from Formula VII(b), VII(c), VII(d), VII(e), or mixtures thereof.

Preferably, the organosiloxane groups on the silica are a combination of Formula VII(a), VII(b), and hydroxide groups which x is about 0 to about 5, or a combination of Formula VII(a), VII(d), and hydroxide groups. The mole ratio of trimethylsiloxy groups to dimethylvinylsiloxy groups is about 50:1 to about 5:1. The methods of treating silica in situ are well known in the art. The treating compounds can include hexamethyldisilazane for Formula VII(a) organosiloxane groups, symmetrical-tetramethyldivinyldisilazane, hexamethyldisilazane having the formula:

$(CH_3)_3Si—NH—Si(CH_3)_3$  Formula VIII(a)

and tetramethyldivinyldisilazane having the formula $CH_2=CH(CH_3)_2Si—NH—Si(CH_3)_2CH=CH_2$  Formula VIII(b)

for Formula VII(b); organosiloxane groups, symmetrical-dimethyldiphenyldivinyldisilazane for Formula VII(c); organosiloxane groups and hydroxyl enblocked polydiorganosiloxane having about 1 to about 5 methylvinylsiloxane units and about 1 to about 10 dimethylsiloxane units for Formula VII(d); organosiloxane groups, and hydroxyl enblocked polyorganosiloxane having about 1 to about 10 dimethylsiloxane units for Formula VII(e).

Other treatments to the silica filler can include cyclic polysiloxanes as described, for example, in U.S. Pat. No. 2,938,009, hereby incorporated by reference in its entirety. Another method for treating fillers is disclosed in U.S. Pat. No. 3,024,126, hereby incorporated by reference in its entirety. The fillers may also be silazane treated fillers in accordance with U.S. Pat. No. 3,635,743, hereby incorporated by reference in its entirety. These fillers are generally utilized in a concentration of 5 to 70 parts of treated filler for each 100 parts of vinyl siloxane polymer. More preferably, the filler is utilized at a concentration of 10 to 40 parts of filler per 100 parts of vinyl siloxane polymer.

The silicas of Formula VII can be prepared by treating silica with organosolixane compounds and thereafter mixing the treated silica with the other ingredients of the silicas of Formula VII can be prepared in the presence of triorganosiloxy endblocked polydimethylsiloxane fluid, an in situ method. Such methods of treating silica are broadly known in the art, and are applicable to this invention to prepare the treated silicas. Additional methods and treatments for silica fillers are disclosed in U.S. Pat. Nos. 3,884,866; 4,162,243; and 5,928,564, and Zumbrum, *Adhesion International* 1993, Proceedings of the 16$^{th}$ Annual Meeting, pp. 471-486, each of which are hereby incorporated by reference in their entirety.

Hydroxy containing organopolysiloxane fluid or resin may be added to improve the mold release properties and extend the shelf life of the liquid injection molding organopolysiloxane composition. Where silazane treated precipitated silica filler or fumed silica filler is present in the composition, the hydroxyl containing organopolysiloxane fluid or resin may be added in conjunction with the precipitated silica filler or fumed silica filler to obtain extended shelf life and mold release. The hydroxyl containing organosiloxane fluids have a viscosity of from about 5 to about 100 centipoise at 25° C. and preferably from about 20 to about 50 centipoise. These fluids or resins may be represented by the formula:

$R_q(OH)_rSiO_{(4-q-r)/2}$  Formula IX where R is defined as above, q may range from about 0 to about 3, preferably from about 0.5 to about 2.0, r ranges from about 0.005 to about 2, and the sum of q and r ranges from about 0.8 to about 3.0. The hydroxyl substitution on the organopolysiloxane fluid or resin is primarily a terminal hydroxyl substitution. Suitable hydroxyl containing organopolysiloxane resins have a viscosity of from about 100 to about 15,000 centipoise at 25° C., and preferably from about 100 to about 1,000 centipoise.

More preferably, the release agents have the formula: $M_xQ^{OH}$, where x ranges from 1 to 3, and M and Q refer to the nomenclature explained in the research monograph by H. A. Liebhafsky, "Silicones Under the Monogram," published by Wiley-Interscience division of John Wiley and Sons, New York (publication date 1978) at pages 99 and following, and which is hereby incorporated by reference in its entirety. $M_xQ^{OH}$ is a three-dimensional resin network that may act as a silicone release agent. Methods of manufacturing and the composition of the $M_xQ^{OH}$ release agent can be found in U.S. Pat. Nos. 4,160,858 and 4,239,877, each of which are hereby incorporated by reference in their entirety.

The at least one pre-structuring compound can be a hydroxy organosiloxane fluid of the following formula:

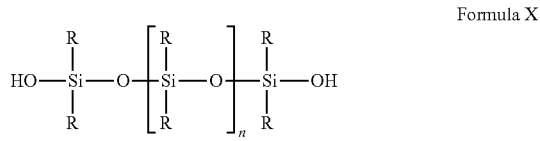

Formula X where R is defined as above and n ranges from about 0 to about 10. Preferably, the pre-structuring compound is a dimethyl silanol stopped polydimethylsiloxane polymer of Formula X, where R are methyl groups and n ranges from about 4 to about 10. The pre-structuring compound can react with untreated silanols on the treated filler surface causing thickening of the compound during the compound operation and thus preventing slow compound structuring during room temperature storage of the product over many years.

In one embodiment the ratio of base components can vary depending on the desired properties of the final cured product. With respect to vinyl siloxane polymers, the base can contain either all Formula I-1, Formula I-2, Formula I-3, Formula I-4, Formula I-5, Formula I-6, or Formula I-7, or a combination of any or all of Formulas I-1-I-7. If there is a blend of Formula I-3 and I-4, there is preferably about 20 to about 90 parts by weight, and more preferably from about 30 to about 80 parts by weight of Formula I-3; and from about 5 to about 40 parts by weight, and more preferably from about 10 to about 30 parts by weight of Formula I-4. Such a mixture may result in the cured product having good tensile strength, elongation, and tear strength properties.

With respect to the hydride cross linkers of Formulas II-1-II-3 and the hydrogen containing siloxane resin containing monofunctional units and tetrafunctional units, the base can contain either all Formula II-3 or all of the hydrogen containing siloxane resin, or a blend. Preferably, the hydride cross linkers are present in about 1 to about 100 parts by weight per 100 parts of vinyl siloxane polymers. More preferably, about 1 to about 50 parts by weight of the hydrogen cross linkers per 100 parts of vinyl siloxane polymers.

The concentration of catalyst can vary between about 0.1 parts per million to about 50 parts per million based on the total weight of the vinyl siloxane polymer and the hydride crosslinker. Preferably, the concentration is between about 0.1 parts per million to about 10 parts per million. The concentration of inhibitor can range between about 0 parts by weight of base to about 3.0 parts by weight of base, and preferably about 0 parts by weight of base to about 1.0 parts by weight of base. Optionally, the filler may be present in an amount between about 10 parts by weight of base to about 40 parts by weight of base, and preferably between about 18 parts by weight of base to about 30 parts by weight of base. Further, the release agent may be present in an amount between about 0 parts by weight of base to about 5 parts by weight of base, and preferably between about 0.2 parts by weight of base to about 1.0 parts by weight of base. Also optional is the pre-structuring compound. This may be present in an amount from about 0 parts by weight of base to about 6 parts by weight of base, and preferably between about 0.2 parts by weight of base to about 1.0 parts by weight of base.

In another embodiment, the base can contain either separately or as a blend, vinyl siloxane polymers of Formula I-5-I-7, hydride cross linkers of Formula II-3-II-7, and an inhibitor. Optionally, the base can contain fillers, releasing agents, and pre-structuring compounds. Preferably, the base can contain either Formula I-5-I-7 alone or as a blend in a concentration between about 20 to 90 parts by weight of base, and more preferably about 30 to 80 parts by weight of base. Regarding the hydride cross linkers of Formula II-3-II-7, they are preferably present alone or as a blend in about 1 to about 100 parts by weight per 100 parts of vinyl siloxane polymers, and more preferably about 1 to about 50 parts by weight per 100 parts of vinyl siloxane polymers. The concentration of catalyst can vary between about 0.1 parts per million to about 50 parts per million based on the total weight of the vinyl siloxane polymer and the hydride crosslinker. Preferably, the concentration is between about 0.1 parts per million to about 10 parts per million. The concentration of inhibitor can range between about 0 parts by weight of base to about 2.5 parts by weight of base, and preferably about 0 parts by weigh of base to about 1.0 parts by weight of base. Optionally, the filler may be present in an amount between about 10 parts by weight of base to about 40 parts by weight of base, and preferably between about 18 parts by weight of base to about 30 parts by weight of base. Further, the release agent may be present in an amount between about 0 parts by weight of base to about 5 parts by weight of base, and preferably between about 0.2 parts by weight of base to about 1.0 parts by weight of base. Also optional is the pre-structuring compound. This may be present in an amount from about 0 parts by weight of base to about 6 parts by weight of base, and preferably between about 0.2 parts by weight of base to about 1.0 parts by weight of base.

In a preferred embodiment, the base may contain the following formulation—Formulation 1:

a) Formula I-5 at a viscosity of about 40,000 to about 100,000 centipoise and at a concentration of about 15 to about 90 parts by weight of base. Preferably, the concentration is about 50 to about 84 parts by weight of base, and most preferably about 60 to about 68 parts by weight of base.

b) Formula I-6 at a viscosity of about 1000 centipoise and at a concentration of about 0 to about 10 parts by weight of base. Preferably, the concentration is about 2 to 6 parts by weight of base, and most preferably about 3 to about 5 parts by weight of base.

c) Formula I-7 at a viscosity of about 400 centipoise and a concentration of about 0 to about 12 parts by weight of base. Preferably, the concentration is about 2.5 to about 8.0 parts by weight of base, and most preferably about 3 to about 6 parts by weight of base.

d) Formula II-7 at a concentration of about 0 to about 5 parts by weight of base. Preferably, the concentration is about 0.75 to about 1.6 parts by weight of base, most preferably about 1.0 to about 1.3 parts by weight of base.

e) Formula II-4 at a concentration of about 0 to about 5 parts by weight of base. Preferably, the concentration is about 0.1 to about 0.8 parts by weight of base, most preferably about 0.2 to about 0.6 parts by weight of base.

f) Formula VI at a concentration of about 0 to about 2.5 parts by weight of base.

Preferably, the concentration is about 0 to about 1.0 parts by weight of base, most preferably about 0 to about 0.5 parts by weight of base. The inhibitor can be mixed in (1) tetramethyl divinylsiloxane; (2) tetramethyl tetravinyl cyclosiloxane; and/or (3) dimethylvinyl terminated polydimethlysiloxane polymer, and then further blended in about a 500 centipoise to about 5,000 centipoise dimethylvinyl terminated polydimethylsiloxane polymer to form an inhibitor master batch.

g) In situ treated fumed silica treated with hexamethyldisilazane and tetramethyldivinyldisilazane to form a surface treated filler with an area of about 200 m² per gram to about 400 m² per gram at a concentration of about 10 to about 40 parts by weight of base. Preferably, the concentration is about 18 to about 30 parts by weight of base, most preferably about 20 to about 28 parts by weight of base.

h) A release agent having the formula $M_xQ^{OH}$, where x ranges from 1 to 3, at a concentration about 0 to about 5 parts by weight of base. Preferably, the concentration is about 0.2 to about 1.0 parts by weight of base, most preferably about 0.3 to about 0.8 parts by weight of base.

i) Formula X where R are methyl groups and n ranges from about 4 to about 12, at a concentration of about 0 to about 6 parts by weight of base. Preferably, the concentration is about 0.2 to about 1.0 parts by weight of base, most preferably about 0.3 to about 0.8 parts by weight of base.

For the sake of convenience, the composition ranges of Formulation 1 listed above are reproduced in tabular form in TABLE 1, below:

TABLE 1

Formulation 1

| Component | Part by Weight of Base | | |
|---|---|---|---|
| | Preferred | More Preferred | Most Preferred |
| Formula I-5 (vinyl siloxane) | 15-90 | 50-84 | 60-68 |
| Formula I-6 (vinyl siloxane) | 0-10 | 2-6 | 3-5 |
| Formula I-7 (vinyl siloxane) | 0-12 | 2.5-8 | 3-6 |
| Formula II-7 (crosslinker) | 0-5 | 0.75-1.6 | 1.0-1.3 |
| Formula II-4 (crosslinker) | 0-5 | 0.1-0.8 | 0.2-0.6 |
| Formula VI (inhibitor) | 0-2.5 | 0-1.0 | 0-0.5 |
| Treated fumed silica with hexamethyldisilazane and tetramethyldivinyldisilazane | 10-40 | 18-30 | 20-28 |
| Release agent | 0-5 | 0.2-1.0 | 0.3-0.8 |
| Formula X (pre-structuring compound) | 0-6 | 0.2-1 | 0.3-0.8 |

Separate from the Formulation 1 base is the catalyst, which can be between about 5% to about 15% platinum methylvinyl complex in (1) tetramethyl divinylsiloxane; (2) tetramethyl tetravinyl cyclosiloxane; and/or (3) dimethylvinyl terminated polydimethylsiloxane polymer. Preferably, the catalyst is about 10% platinum methylvinyl complex in any of the above combinations of polymers. The preferred platinum methylvinyl complex is 10% platinum in (1) tetramethyl divinylsiloxane; (2) tetramethyl tetravinyl cyclosiloxane; and/or (3) dimethylvinyl terminated polydimethylsiloxane polymer, and then further blended in about a 500 centipoise to about 5,000 centipoise dimethylvinyl terminated polydimethylsiloxane polymer to form a catalyst master batch. The concentration of the platinum catalyst in the catalyst master batch is between about 0.1% and about 2.0%, and preferably between about 0.25% and about 1.0%. The concentration of the Pt catalyst in the LSR process is between about 0.1 ppm to about 20 ppm of base and preferably about 5 ppm to about 15 ppm of base. The catalyst/vinyl siloxane polymer blend is fed directly into the LSR mixing/transferring screws, or fed by an injection into the base feed line. When fed into the base feed line, it is preferably injected into the feed line at a point as close as practicable to the point at which the base feed line joins the injection molding machine barrel.

When using a blend of Formula II-4 and II-7 hydride crosslinkers, the ratio of the two cross linkers can be between about 1:6, and preferably about 1:3 of Formula II-4 to Formula II-7. Optionally, a single hydride from either Formula II-4 or Formula II-7 can be separately used.

Optionally, the inhibitor and a portion of the vinyl siloxane polymers can be removed from the base to make an inhibitor master batch, which may be fed directly into the injection molding machine or fed by an injector into the base feed line. The concentration of the inhibitor in the inhibitor master batch is between about 0.1% and about 3.0%, and preferably between about 0.5% and about 2.5%. This optional configuration allows for greater control when manufacturing parts of different sizes, cure times, and desired physical properties. These, along with other configurations, are described more fully below.

Additional additives can include: color master batches, UV stabilizers, light stabilizers, self bonding additives, anti-microbial additives, thermal stabilizers, release agents, anti-static additives, flame proofing additives, low compression set additives, durometer adjustment additives, oil resistance additives, anti-crepe hardening additives, mold release additives, plasticizers, thickening or consistency increase additives, and blowing agents. These additives can either be added: 1) to the liquid silicone rubber base; 2) to the inhibitor master batch; 3) to the catalyst master batch; 4) as a separate feed into the base feed line; or 5) as a separate feed directly into the injection molding machine.

Unexpectedly, the injection molding machine transfer screw provides sufficient mixing to thoroughly mix the individual components used in the processes of the present invention. This obviates the need for premixing, and so obviates the need for expensive equipment to achieve premixing.

Also unexpected with the processes of the present invention was the nearly instantaneous yield of perfectly molded parts upon molding start-up, as compared with the standard two-part LSR process start-up, which requires the process to run for 30 to 60 minutes (lining out the process) before good parts are obtained. In other words, the processes of the present invention eliminate the waste of time and material that is inherent in the prior art processes. This is likely due to: 1) the pre-mixed LSR base, which contains vinyl polymer and hydride crosslinker in appropriate and precise molar ratios; 2) precise and controlled addition of the inhibitor master batch; and 3) precise and controlled addition of the catalyst master batch.

The methods for producing the molded silicone rubber product are described below with reference to FIGS. 1-11.

FIG. 1 shows the standard two-part LSR process of the prior art. A base storage tank 100 is connected to a static mixer 120 via a base feed pump 105 and base feed line 106. The base storage tank 100 contains a mixture of vinyl siloxane polymer, treated amorphous fumed silica, and platinum catalyst (component A), which is fed to the static mixer 120 via the pump 105. A hydride master batch storage tank 110 is also connected to the static mixer 120 via a hydride master batch feed pump 115 and hydride master batch feed line 116. The hydride master batch storage tank 110 contains a mixture of vinyl siloxane polymer, treated amorphous fumed silica, hydride crosslinker, and inhibitor (component B), which is fed to the static mixer 120 via the pump 115. The static mixer 120 mixes components A and B, while transferring the mixture to an injection molding machine 5 at the beginning of the mixer 35. The mixer 35 transfers the liquid silicone rubber to an injection shot cavity 40. The liquid silicone rubber in the shot cavity 40 is then transferred to a heated mold 45, where it is cured at a temperature from about 80° C. to about 230° C., depending on the mold size, cure specification, and desired physical properties.

Figure 2:
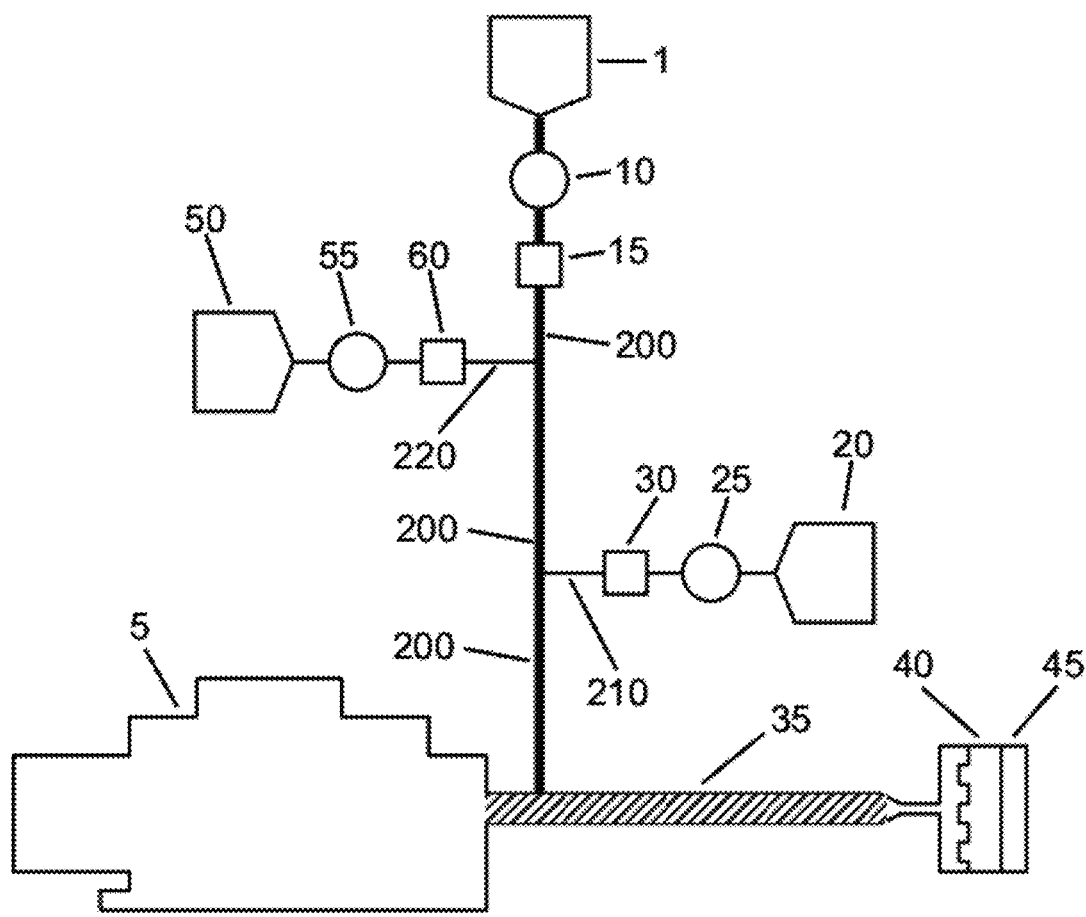
FIG. 2 is a schematic representation of an example of a method for producing a molded silicone rubber product, wherein the inhibitor and catalyst master batches are separate from the liquid silicone rubber base, and the inhibitor and catalyst streams are fed into the base feed line prior to their introduction into the barrel of the injection molding machine.

FIG. 2 shows the LSR process of a preferred embodiment, wherein the inhibitor master batch and the catalyst master batch are separate from the liquid silicone rubber base. Each of the liquid silicone rubber base, inhibitor master batch, and catalyst master batch is fed separately into the base feed line 200, which then feeds into the injection molding machine barrel 35 at a single entry point. The base storage tank 1 is connected to the barrel 35 of an injection molding machine 5 via a base feed pump 10 and an optional base composition feed rate adjuster 15. The base feed rate can be controlled via base feed pump 10, base feed rate adjuster 15, or a combination of both. The base feed pump can be any large displacement pump, such as a Graco Bulldog 10:1 Transfer Pump. In the configuration of FIG. 2, the liquid silicone rubber base contained in the base storage tank 1 may comprise: a) at least one vinyl siloxane polymer and at least one hydride crosslinker; b) all the components of a), plus at least one filler; c) all the components of b), plus at least one pre-structuring compound; or d) all the components of c), plus at least one release agent. The weight percent of vinyl siloxane polymer mixed with the hydride crosslinker is about 85% to about 99%, and preferably about 95% to about 99%. The inhibitor master batch storage tank 50 is connected to the base feed line 200 via an inhibitor master batch feed pump 55, optionally, an inhibitor master batch composition feed rate adjuster 60, and an inhibitor feed line 220. The inhibitor master batch feed pump may be any small piston displacement pump, gear pump, micro motion injector pump, or other positive displacement pump. The addition of at least one vinyl siloxane polymer to the inhibitor master batch is optional, but preferred. If added, the weight percent of vinyl siloxane polymers mixed with the inhibitor could be subtracted from the vinyl siloxane polymers contained in the base. Thus, the total weight percent of vinyl siloxane polymers would remain constant. Generally, the weight percent of inhibitors mixed with the vinyl siloxane polymers is about 0.1% to about 3.0%, and preferably about 0.5% to about 2.5%. Removing the inhibitor from the base allows for greater operator control when making different molded parts. Similarly, the catalyst storage tank 20 is also connected to the base feed line 200 via a catalyst feed pump 25, an optional catalyst feed rate adjuster 30, and a catalyst feed line 210. The catalyst fed rate can be controlled via catalyst feed pump 25, catalyst feed rate adjuster 30, or a combination of both. The catalyst feed pump may be any small piston displacement pump, gear pump, micro motion injector pump, or other positive displacement pump. Generally, the weight percent of platinum catalyst mixed with at least one vinyl siloxane polymer is about 0.1% to about 3.0%, and preferably about 1.0%. Upon delivery to the injection molding machine barrel 35 by the base feed line 200, the liquid silicone rubber base, inhibitor master batch, and catalyst master batch are mixed in said barrel 35 by operation of the injection molding machine 5.

Figure 3:
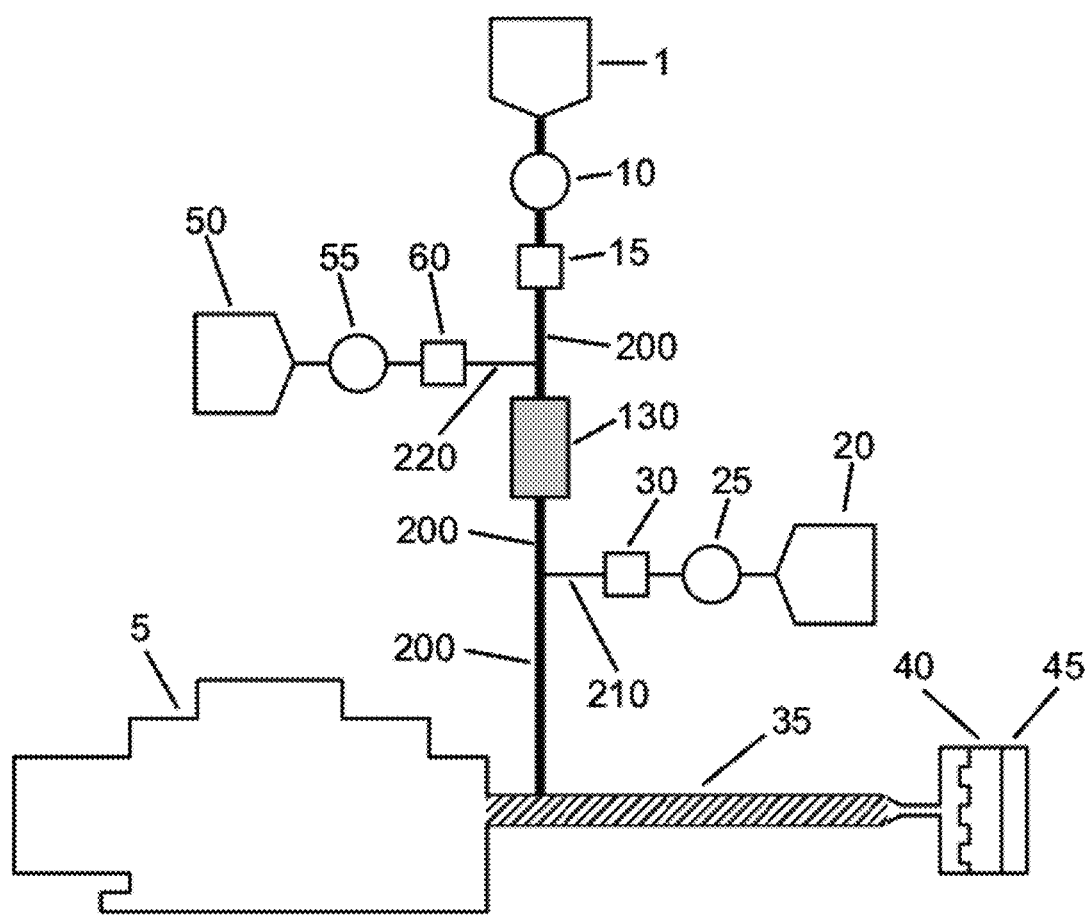
FIG. 3 is a schematic representation of an example of a method for producing a molded silicone rubber product, similar to that shown in FIG. 2, wherein the base feed line enters a mixer at a point after—or below the point at which—inhibitor master batch enters the base feed line and before—or above the point at which—catalyst master batch enters the base feed line.

FIG. 3 shows another preferred embodiment, similar to that shown in FIG. 2, except that the base feed line 200 feeds into a mixer 130 after—or below the point at which—inhibitor master batch enters the base feed line 200 via inhibitor feed line 220 and before—or above the point at which—catalyst master batch enters the base feed line 200 via catalyst feed line 210. In this way, the liquid silicone rubber base from the base storage tank 1 and the inhibitor master batch from the inhibitor master batch storage tank 50 are mixed in the mixer. The mixer may be either a static mixer, a dynamic mixer, or an "orifice" as described above.

Figure 4:
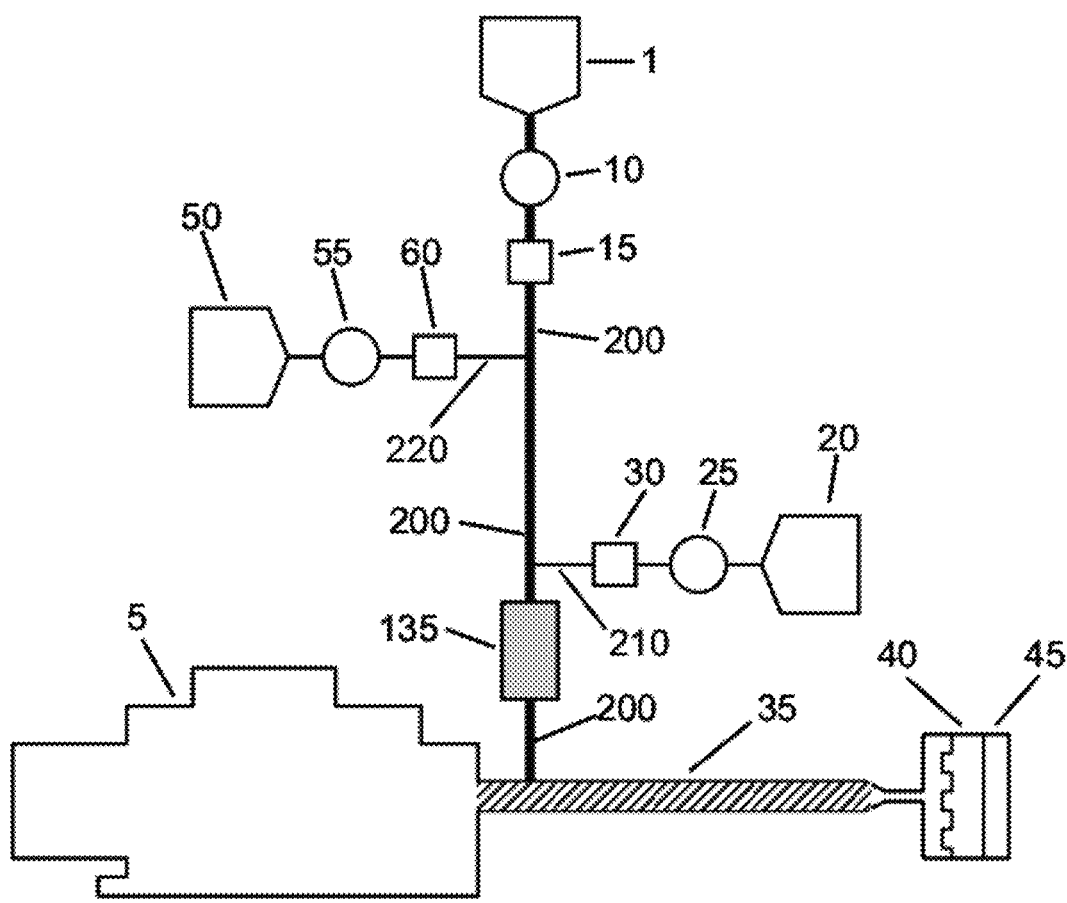
FIG. 4 is a schematic representation of an example of a method for producing a molded silicone rubber product, similar to that shown in FIG. 3, wherein the base feed line enters a mixer at a point after—or below the point at which—catalyst master batch enters the base feed line.

FIG. 4 shows another preferred embodiment, similar to that shown in FIG. 3, except that the base feed line 200 feeds into a mixer 135 after—or below the point at which—catalyst master batch enters the base feed line 200 via catalyst feed line 210. In this way, the liquid silicone rubber base from the base storage tank 1, the inhibitor master batch from the inhibitor master batch storage tank 50, and the catalyst master batch from the catalyst master batch storage tank 20 are mixed in the mixer. The mixer may be either a static mixer, a dynamic mixer, or an "orifice" as described above.

Figure 5:
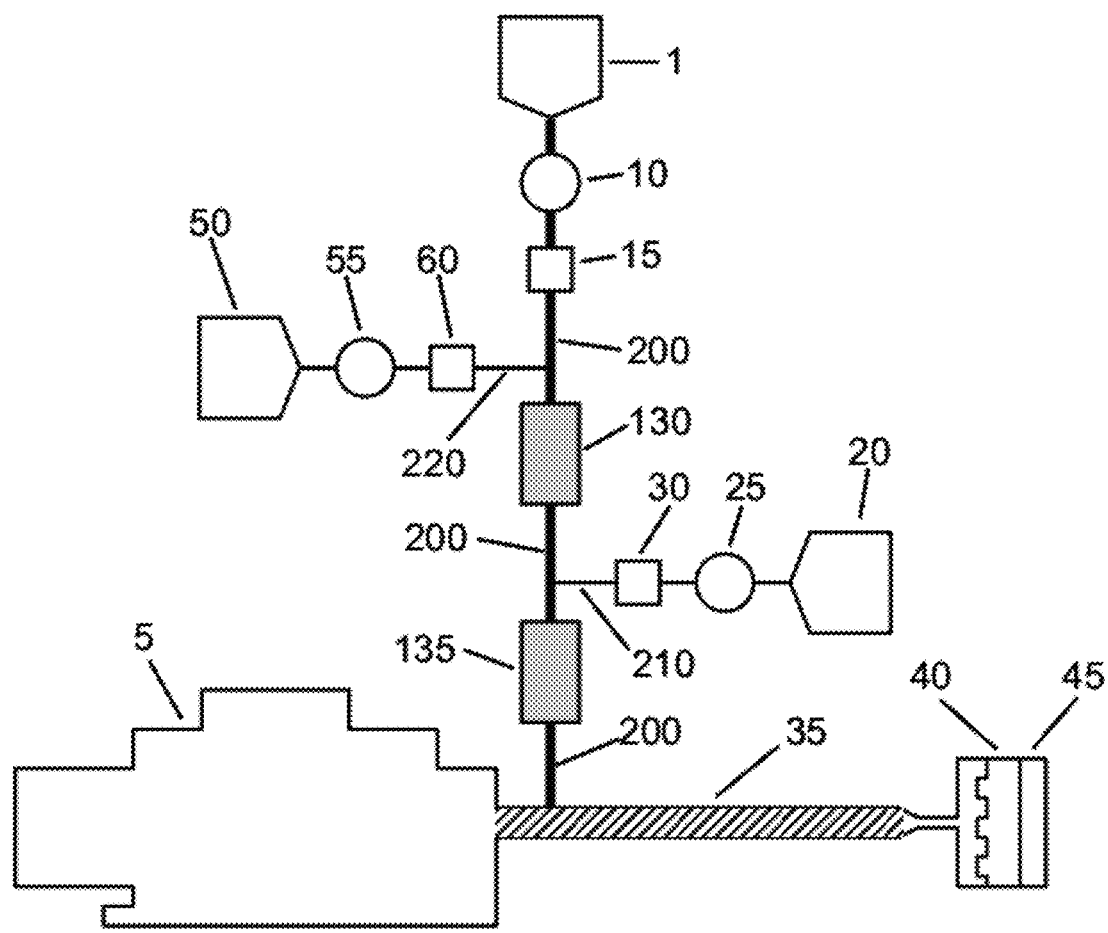
FIG. 5 is a schematic representation of an example of a method for producing a molded silicone rubber product, similar to that shown in FIGS. 3 and 4, wherein the base feed line feeds into a first mixer after—or below the point at which—inhibitor master batch enters the base feed line and before—or above the point at which—catalyst master batch enters the base feed line. Subsequently, the base feed line feeds into a second mixer after—or below the point at which—catalyst master batch enters the base feed line.

FIG. 5 shows another preferred embodiment, similar to that shown in FIGS. 3 and 4, except that the base feed line 200 feeds into a first mixer 130 after—or below the point at which—inhibitor master batch enters the base feed line 200 via inhibitor feed line 220 and before—or above the point at which—catalyst master batch enters the base feed line 200 via catalyst feed line 210. Subsequently, the base feed line 200 feeds into a second mixer 135 after—or below the point at which—catalyst master batch enters the base feed line 200 via catalyst feed line 210. In this way, the liquid silicone rubber base from the base storage tank 1 and the inhibitor master batch from the inhibitor master batch storage tank 50 are mixed in the first mixer, which may be either a static mixer, a dynamic mixer, or an "orifice" as described above, and the catalyst master batch from the catalyst master batch storage tank 20 is then mixed with the liquid silicone rubber base and inhibitor master batch mixture by the second mixer 135 which, independently from the first mixer 130, may be either a static mixer, a dynamic mixer, or an "orifice" as described above.

Figure 6:
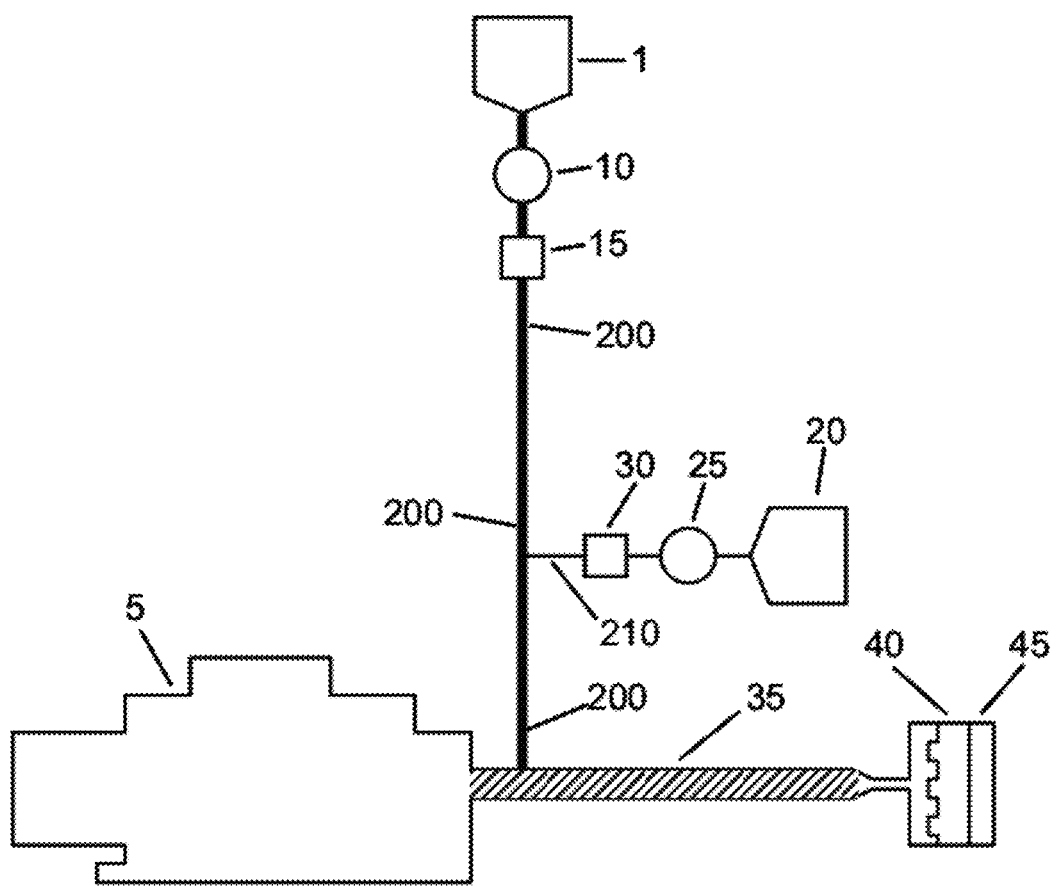
FIG. 6 is a schematic representation of an example of a method for producing a molded silicone rubber product, wherein the liquid silicone rubber base contains at least one injection molding inhibitor, and the base is separate from the catalyst master batch. The liquid silicone rubber base and catalyst master batch are fed separately into the base feed line, which then feeds into the injection molding machine barrel at a single entry point.

FIG. 6 shows another preferred embodiment, wherein the catalyst master batch is separate from the liquid silicone rubber base, which contains inhibitor. The liquid silicone rubber base and catalyst master batch are fed separately into the base feed line 200, which then feeds into the injection molding machine barrel 35 at a single entry point. The base storage tank 1 is connected to the barrel 35 of an injection molding machine 5 via a base feed pump 10, an optional base composition feed rate adjuster 15, and the base feed line 200. The base feed rate can be controlled via base feed pump 10, base feed rate adjuster 15, or a combination of both. The base feed pump can be any large displacement pump, such as a Graco Bulldog 10:1 Transfer Pump. In the configuration of FIG. 6, the liquid silicone rubber base contained in the base storage tank 1 may comprise: a) at least one vinyl siloxane polymer, at least one hydride crosslinker, and at least one liquid injection molding inhibitor; b) all the components of a), plus at least one filler; c) all the components of b), plus at least one pre-structuring compound; d) all the components of c), plus at, least one release agent; or e) at least one hydride crosslinker with at least one liquid injection molding inhibitor. If the liquid silicone rubber base comprises both at least one vinyl siloxane polymer and at least one hydride crosslinker, then the weight percent of vinyl siloxane polymer mixed with the hydride crosslinker is about 85% to about 99%, and preferably about 95% to about 99%. The catalyst storage tank 20 is connected to the base feed line 200 via a catalyst feed pump 25, an optional catalyst feed rate adjuster 30, and a catalyst feed line 210. The catalyst fed rate can be controlled via catalyst feed pump 25, catalyst feed rate adjuster 30, or a combination of both. The catalyst feed pump may be any small piston displacement pump, gear pump, micro motion injector pump, or other positive displacement pump. Generally, the weight percent of platinum catalyst mixed with the vinyl siloxane polymer is about 0.1% to about 3.0%, and preferably about 1.0%. Upon delivery to the injection molding machine barrel 35 by the base feed line 200, the liquid silicone rubber base and catalyst master batch are mixed in said barrel 35 by operation of the injection molding machine 5.

Figure 7:
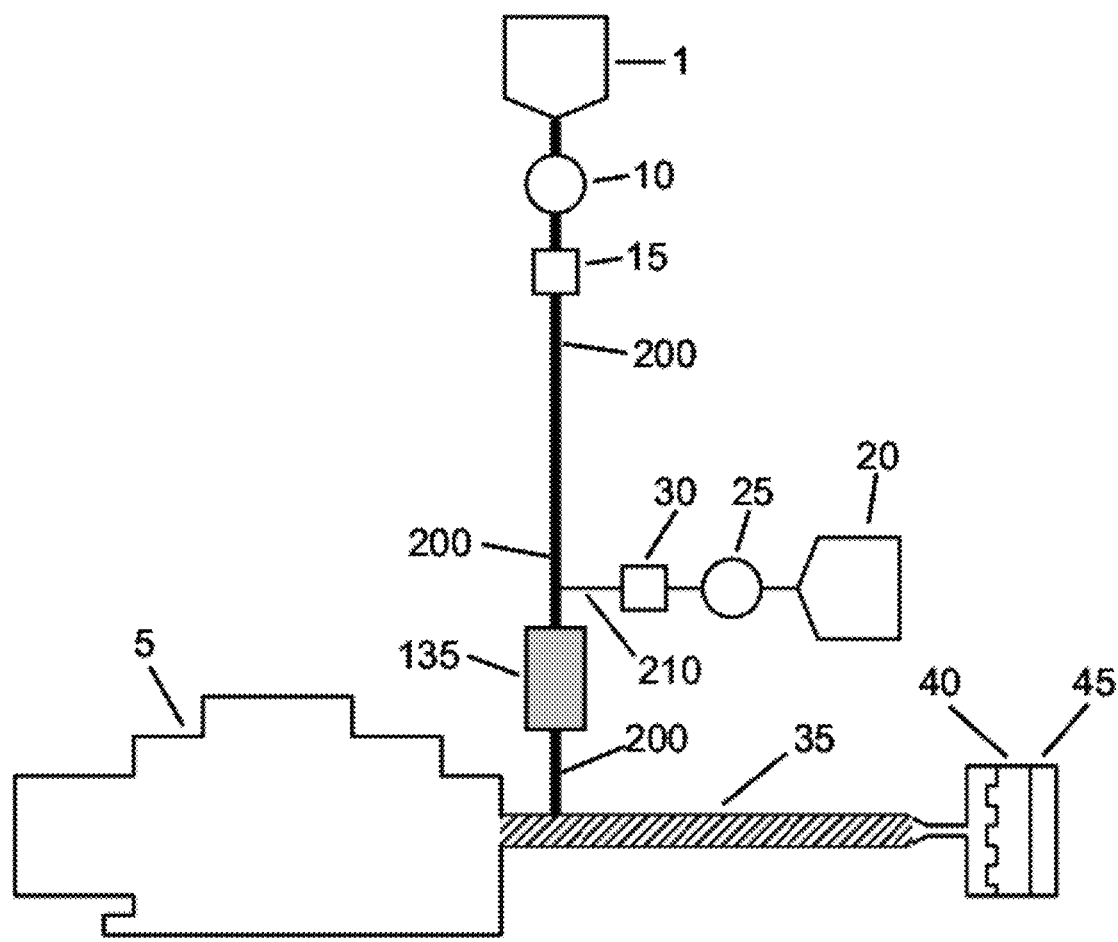
FIG. 7 is a schematic representation of an example of a method for producing a molded silicone rubber product, similar to that shown in FIG. 6, wherein the base feed line enters a mixer at a point after—or below the point at which—catalyst master batch enters the base feed line.

FIG. 7 shows another preferred embodiment, similar to that shown in FIG. 6, except that the base feed line 200 feeds into a mixer 135 after—or below the point at which—catalyst master batch enters the base feed line 200 via catalyst feed line 210. In this way, the liquid silicone rubber base from the base storage tank 1 and the catalyst master batch from the catalyst master batch storage tank 20 are mixed in the mixer. The mixer may be either a static mixer, a dynamic mixer, or an "orifice" as described above. As with the configuration of FIG. 6, in the configuration of FIG. 7 the liquid silicone rubber base contained in the base storage tank 1 may comprise: a) at least one vinyl siloxane polymer, at least one hydride crosslinker, and at least one liquid injection molding inhibitor; b) all the components of a), plus at least one filler; c) all the components of b), plus at least one pre-structuring compound; d) all the components of c), plus at least one release agent; or e) at least one hydride crosslinker with at least one liquid injection molding inhibitor. If the liquid silicone rubber base comprises both at least one vinyl siloxane polymer and at least one hydride crosslinker, then the weight percent of vinyl siloxane polymer mixed with the hydride crosslinker is about 85% to about 99%, and preferably about 95% to about 99%.

Figure 8:
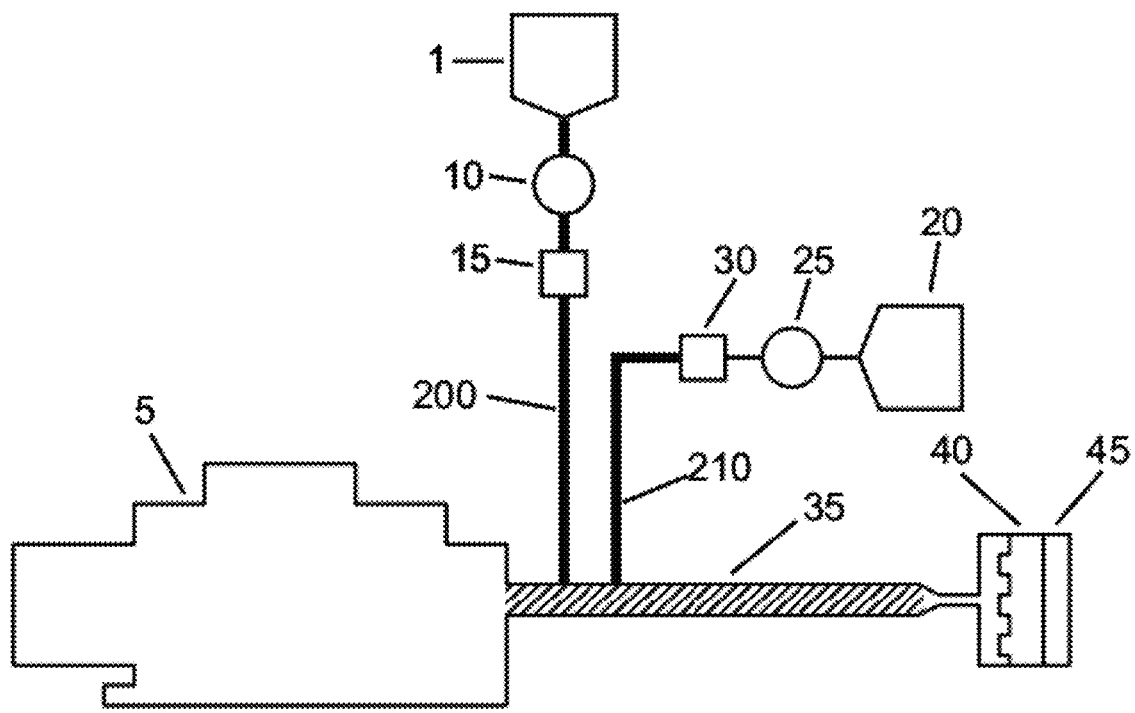
FIG. 8 is a schematic representation of an example of a method of the present invention for producing a molded silicone rubber product.

FIG. 8 shows the LSR process of a preferred embodiment. The base storage tank 1 is connected to an injection molding machine 5 via a base feed pump 10, an optional base composition feed rate adjuster 15, and a base feed line 200. The base feed rate can be controlled via base feed pump 10, base feed rate adjuster 15, or a combination of both. The base feed pump can be any large displacement pump, such as a Graco Bulldog 10:1 Transfer Pump. Similarly, the catalyst storage tank 20 is connected to the injection molding machine 5 via a catalyst feed pump 25, an optional catalyst feed rate adjuster 30, and a catalyst feed line 210. The catalyst fed rate can be controlled via catalyst feed pump 25, catalyst feed rate adjuster 30, or a combination of both. The catalyst feed pump may be any small piston displacement pump, gear pump, micro motion injector pump, or other positive displacement pump. Generally, the weight percent of platinum catalyst mixed with the vinylsiloxane polymer is about 0.1% to about 3.0%, and preferably about 1.0%.

During operation, the base feed pump 10 transfers the vinyl siloxane polymer, hydride crosslinker, inhibitor, and optional filler and pre-structuring compound containing base to the injection molding machine at the beginning of the mixer 35. Once the base enters the injection molding machine 5 via the base feed line 200, the catalyst feed pump 25 begins transferring the catalyst to the injection molding machine at the beginning of the mixer 35 via the catalyst feed line 210. The mixer 35 mixes the base and catalyst, while transferring the liquid silicone rubber to an injection shot cavity 40. The liquid silicone rubber in the shot cavity 40 is then transferred to a heated mold 45, where it is cured at a temperature from about 80° C. to about 230° C., depending on the mold size, cure specification, and desired physical properties. The proportion in which the base and catalyst are mixed can be adjusted as needed by the feed rate adjusters 15 and 30, the pumps 10 and 25, or a combination of both.

Figure 9:
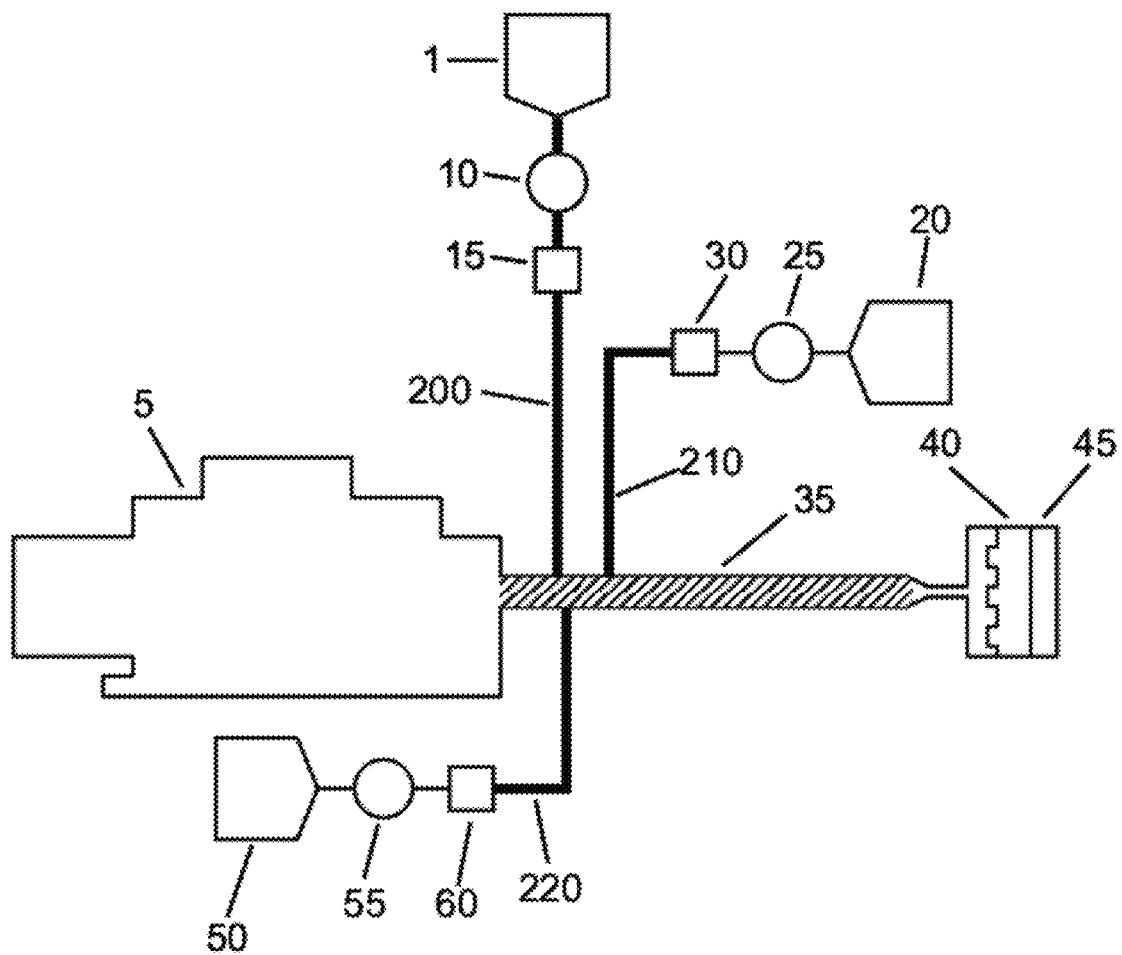
FIG. 9 is a schematic representation of an example of a method of the present invention for producing a molded silicone rubber product where the inhibitor is removed from the base.

FIG. 9 shows another preferred embodiment, wherein the inhibitor may be removed from the base and separately fed into the mixer 35. The inhibitor master batch storage tank 50 is connected to the injection molding machine 5 via an inhibitor master batch feed pump 55, an optional inhibitor master batch composition feed rate adjuster 60, and an inhibitor feed line 220. The inhibitor master batch feed pump may be any small piston displacement pump, gear pump, micro motion injector pump, or other positive displacement pump. The weight percent of vinyl siloxane polymers mixed with the inhibitor could be subtracted from the vinyl siloxane polymers contained in the base. Thus, the total weight percent of vinyl siloxane polymers would remain constant. Generally, the weight percent of inhibitors mixed with the vinyl siloxane polymers is about 0.1% to about 3.0%, and preferably about 0.5% to about 2.5%. Removing the inhibitor from the base allows for greater operator control when making different molded parts. As described above, the mixer may be either a static mixer or screw type mixer (not shown), or the same screw mixer used in the injection molding machine 5.

Figure 10:
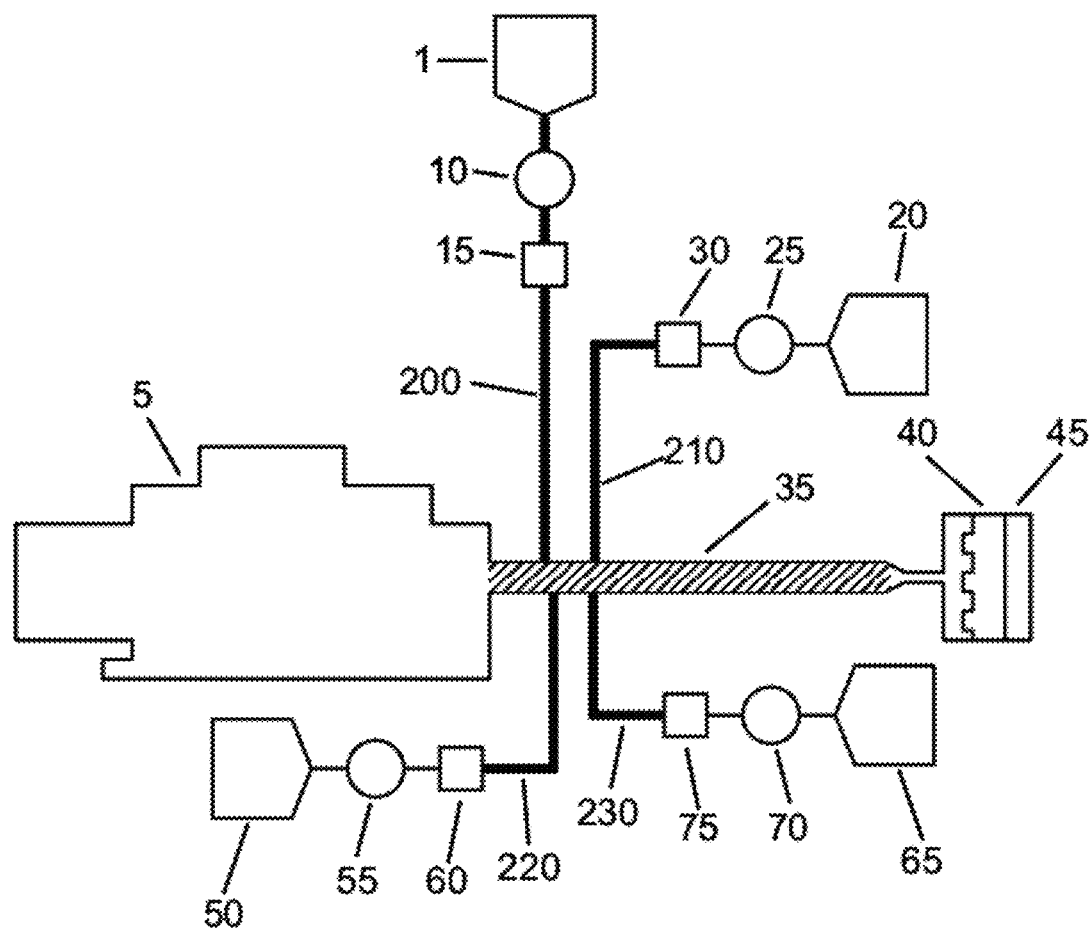
FIG. 10 is a schematic representation of an example of a method for producing a molded silicone rubber product where the inhibitor is removed from the base and there is a separate feed for part of the vinyl siloxane polymers.

FIG. 10 is a further embodiment, where a separate feed of a portion of the vinyl siloxane polymers may be connected to the mixer 35. The vinyl siloxane polymer storage tank 65 is connected to the injection molding machine 5 via a vinyl siloxane polymer feed pump 70, an optional composition feed rate adjuster 75, and a vinyl siloxane polymer feed line 230. The vinyl siloxane polymer feed pump may be any small piston displacement pump, gear pump, micro motion injector pump, or other positive displacement pump. Further, as described in FIG. 10, the inhibitor is removed from the base. This allows the operator to vary the amount of inhibitor while keeping the weight percent of vinyl siloxane polymers constant via the separate feed pump 70.

Figure 11:
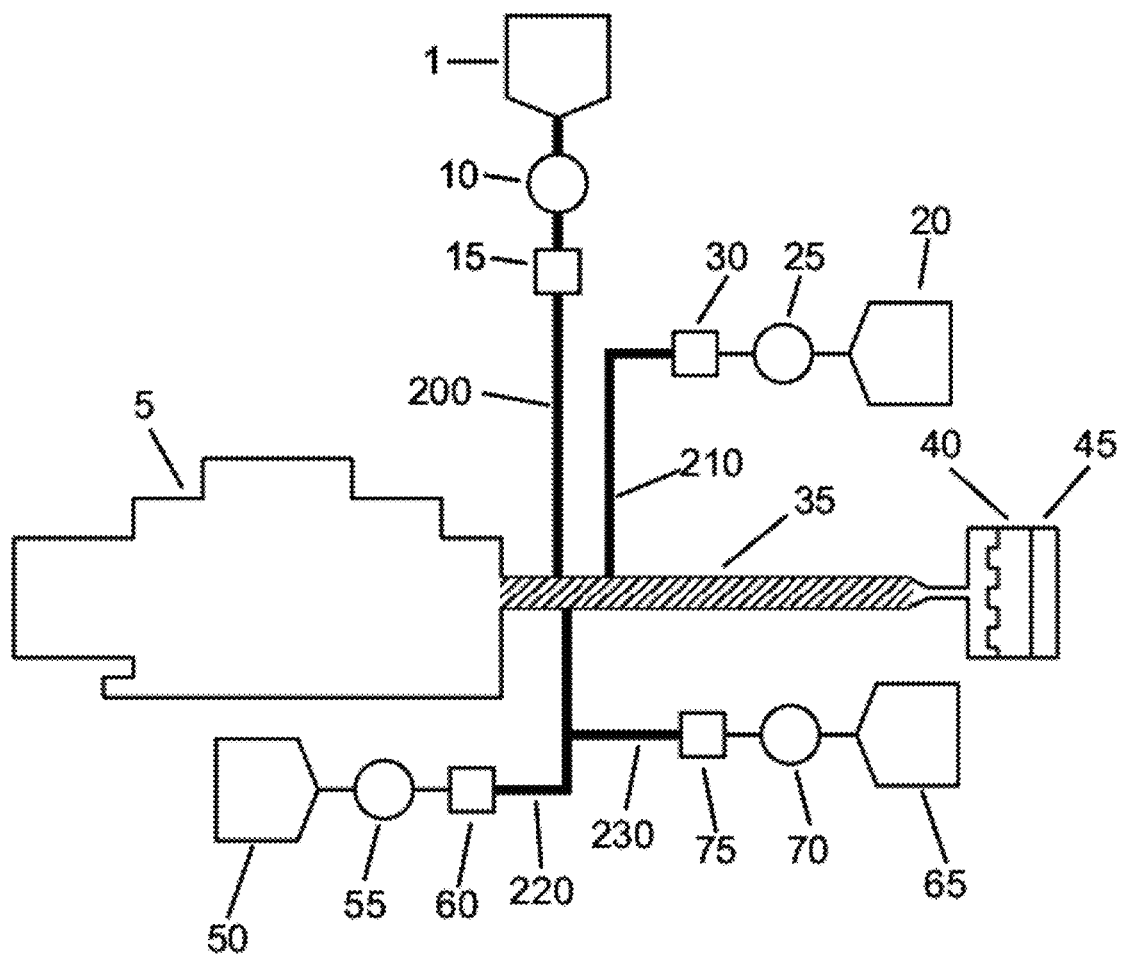
FIG. 11 is a schematic representation of an example of a method for producing a molded silicone rubber product where the inhibitor is removed from the base and the separate vinyl siloxane polymer feed is fed into the inhibitor stream prior to introduction into the mixer.

FIG. 11 is a variation of the above, where the separate vinyl siloxane polymer feed line 230 is fed into the inhibitor feed line 220 prior to introduction into the mixer 35. These two configurations allow for even greater operator control.

Figure 12:
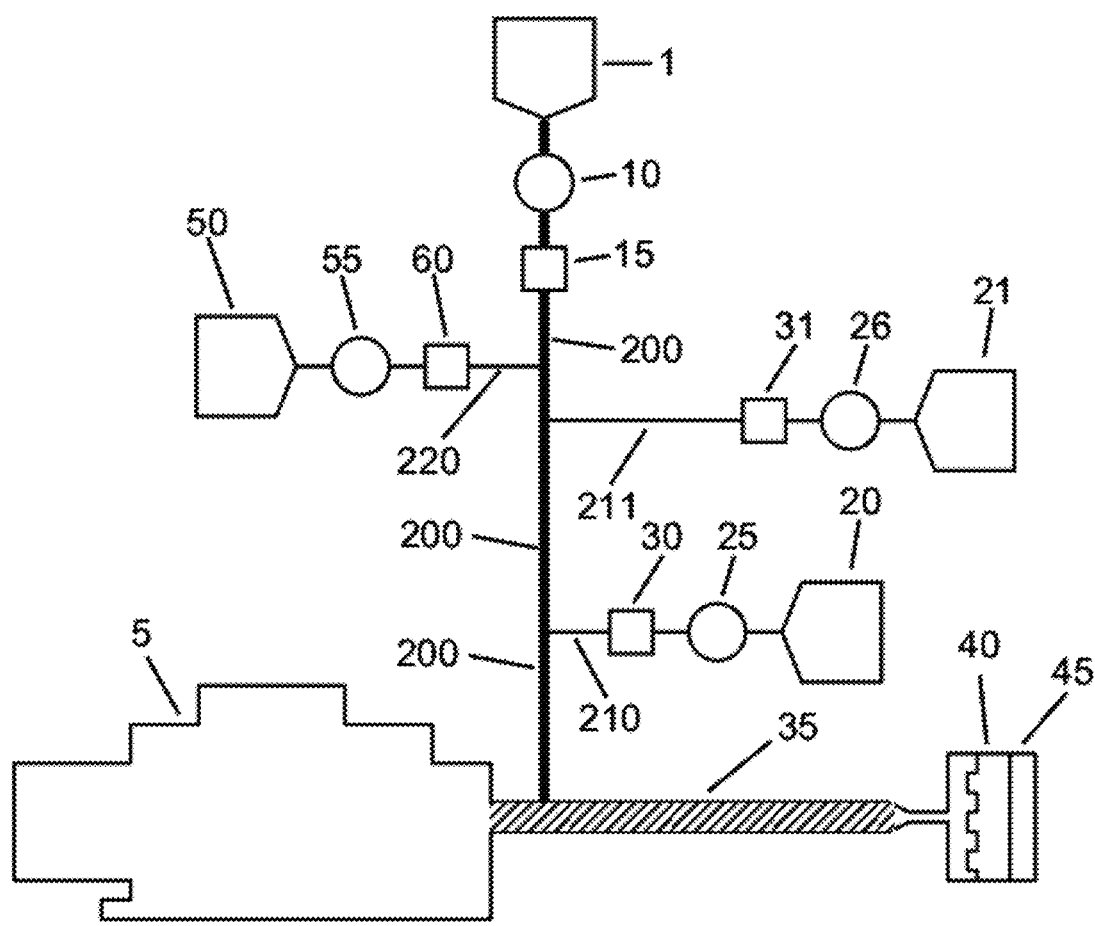
FIG. 12 is a schematic representation of an example of a method for producing a molded silicone rubber product, wherein the inhibitor, additive, and catalyst master batches are separate from the liquid silicone rubber base, and the inhibitor, additive, and catalyst streams are fed into the base feed line prior to their introduction into the barrel of the injection molding machine.

FIG. 12 shows the LSR process of a preferred embodiment, wherein the inhibitor master batch and the catalyst master batch are separate from the liquid silicone rubber base. Each of the liquid silicone rubber base, inhibitor master batch, and catalyst master batch is fed separately into the base feed line 200, which then feeds into the injection molding machine barrel 35 at a single entry point. The base storage tank 1 is connected to the barrel 35 of an injection molding machine 5 via a base feed pump 10 and an optional base composition feed rate adjuster 15. The base feed rate can be controlled via base feed pump 10, base feed rate adjuster 15, or a combination of both. The base feed pump can be any large displacement pump, such as a Graco Bulldog 10:1 Transfer Pump. In the configuration of FIG. 12, the liquid silicone rubber base contained in the base storage tank 1 may comprise: a) at least one vinyl siloxane polymer and at least one hydride crosslinker; b) all the components of a), plus at least one filler; c) all the components of b), plus at least one pre-structuring compound; or d) all the components of c), plus at least one release agent. The weight percent of vinyl siloxane polymer mixed with the hydride crosslinker is about 85% to about 99%, and preferably about 95% to about 99%. The inhibitor master batch storage tank 50 is connected to the base feed line 200 via an inhibitor master batch feed pump 55, optionally, an inhibitor master batch composition feed rate adjuster 60, and an inhibitor feed line 220. The inhibitor master batch feed pump may be any small piston displacement pump, gear pump, micro motion injector pump, or other positive displacement pump. The addition of at least one vinyl siloxane polymer to the inhibitor master batch is optional, but preferred. If added, the weight percent of vinyl siloxane polymers mixed with the inhibitor could be subtracted from the vinyl siloxane polymers contained in the base. Thus, the total weight percent of vinyl siloxane polymers would remain constant. Generally, the weight percent of inhibitors mixed with the vinyl siloxane polymers is about 0.1% to about 3.0%, and preferably about 0.5% to about 2.5%. Removing the inhibitor from the base allows for greater operator control when making different molded parts. The additive storage tank 21 is also connected to the base feed line 200 via an additive feed pump 26, an optional additive feed rate adjuster 31, and an additive feed line 211. The additive feed rate can be controlled via additive feed pump 26, additive feed rate adjuster 31, or a combination of both. The additive feed pump 26 may be any small piston displacement pump, gear pump, micro motion injector pump, or other positive displacement pump. The additive may be selected from the group consisting of color master batches, UV stabilizers, light stabilizers, self bonding additives, anti-microbial additives, thermal stabilizers, release agents, antistatic additives, flame proofing additives, low compression set additives, durometer adjustment additives, oil resistance additives, anti-crepe hardening additives, mold release additives, plasticizers, thickening or consistency increase additives, blowing agents, and combinations thereof. Similarly, the catalyst storage tank 20 is also connected to the base feed line 200 via a catalyst feed pump 25, an optional catalyst feed rate adjuster 30, and a catalyst feed line 210. The catalyst feed rate can be controlled via catalyst feed pump 25, catalyst feed rate adjuster 30, or a combination of both. The catalyst feed pump 25 may be any small piston displacement pump, gear pump, micro motion injector pump, or other positive displacement pump. Generally, the weight percent of platinum catalyst mixed with at least one vinyl siloxane polymer is about 0.1% to about 3.0%, and preferably about 1.0%. Upon delivery to the injection molding machine barrel 35 by the base feed line 200, the liquid silicone rubber base, inhibitor master batch, additive, and catalyst master batch are mixed in said barrel 35 by operation of the injection molding machine 5.

Figure 13:
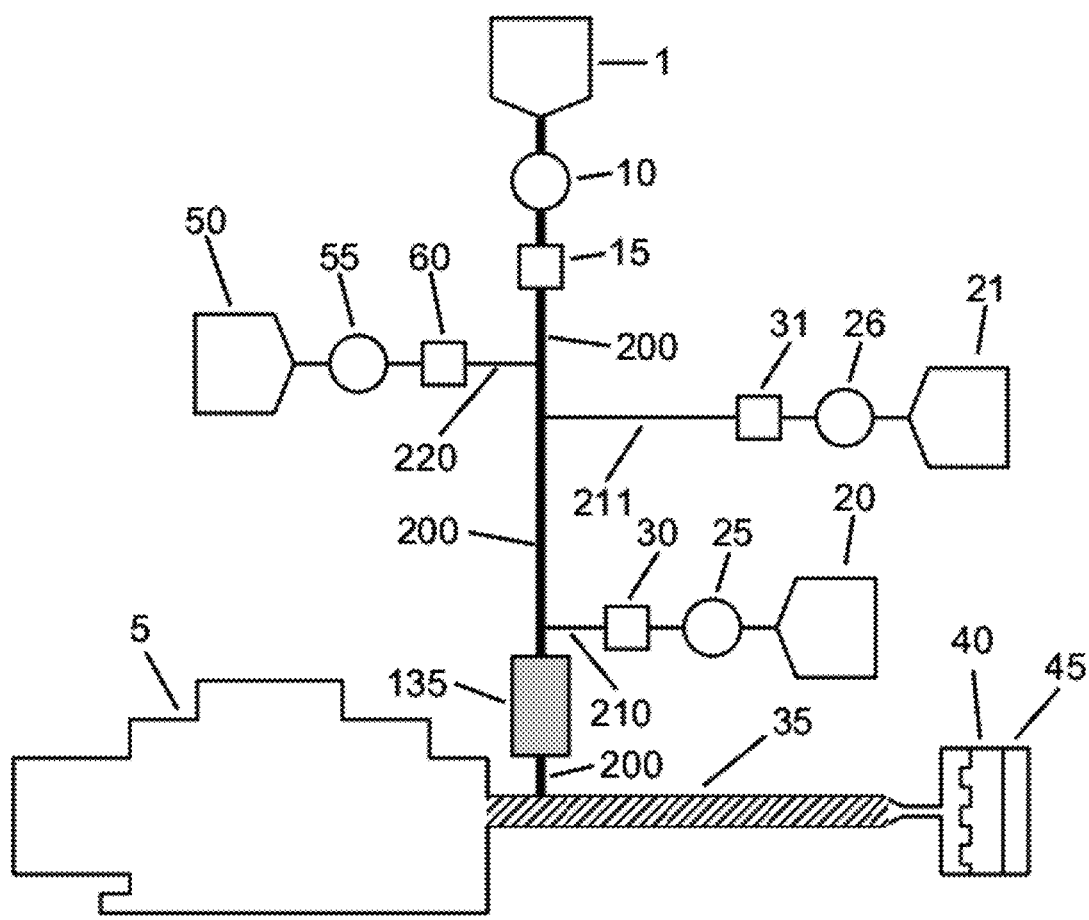
FIG. 13 is a schematic representation of an example of a method for producing a molded silicone rubber product, similar to that shown in FIG. 12, wherein the base feed line enters a mixer at a point after—or below the point at which—inhibitor master batch, additive master batch, and catalyst master batch enter the base feed line.

FIG. 13 shows another preferred embodiment, similar to that shown in FIG. 12, except that the base feed line 200 feeds into a mixer 135 after—or below the point at which—catalyst master batch enters the base feed line 200 via catalyst feed line 210. In this way, the liquid silicone rubber base from the base storage tank 1, the inhibitor master batch from the inhibitor master batch storage tank 50, the additive from the additive master batch storage tank 21, and the catalyst master batch from the catalyst master batch storage tank 20 are mixed in the mixer. The mixer may be either a static mixer, a dynamic mixer, or an "orifice" as described above.

Figure 14:
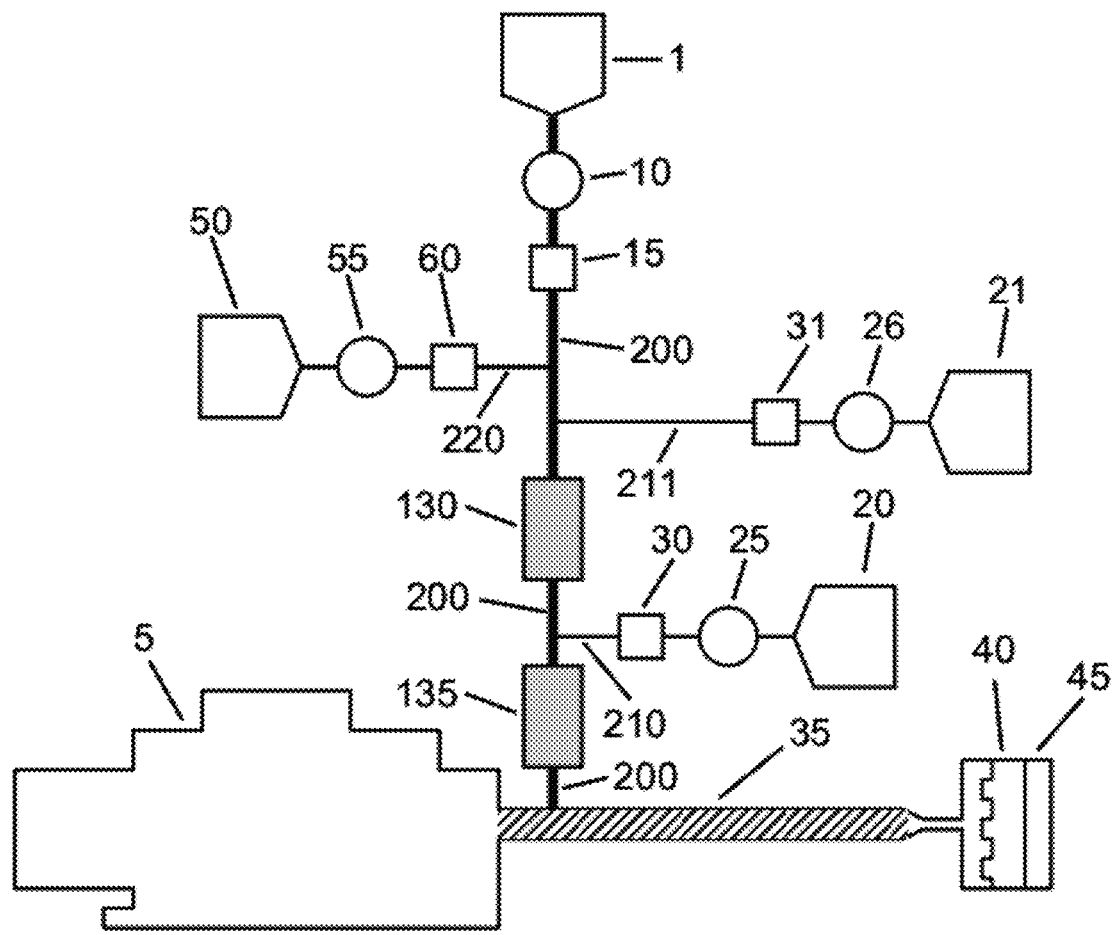
FIG. 14 is a schematic representation of an example of a method for producing a molded silicone rubber product, similar to that shown in FIG. 13, wherein the base feed line enters a mixer at a point after—or below the point at which—inhibitor master batch and additive master batch enter the base feed line and before—or above the point at which—catalyst master batch enters the base feed line, and wherein the base feed line enters a second mixer at a point after—or below the point at which—catalyst master batch enters the base feed line.

FIG. 14 shows another preferred embodiment, similar to that shown in FIG. 13, except that the base feed line 200 feeds into a mixer 130 after—or below the point at which—inhibitor master batch and the additive master batch enter the base feed line 200 via inhibitor feed line 220 and additive feed line 211 (respectively) and before—or above the point at which—catalyst master batch enters the base feed line 200 via catalyst feed line 210. In this way, the liquid silicone rubber base from the base storage tank 1, the inhibitor master batch from the inhibitor master batch storage tank 50, and the additive master batch from the additive master batch storage tank are mixed in the mixer 130. The mixer may be either a static mixer, a dynamic mixer, or an "orifice" as described above. Then, as in FIG. 13, the base feed line 200 feeds into a mixer 135 after—or below the point at which—catalyst master batch enters the base feed line 200 via catalyst feed line 210.

Figure 15:
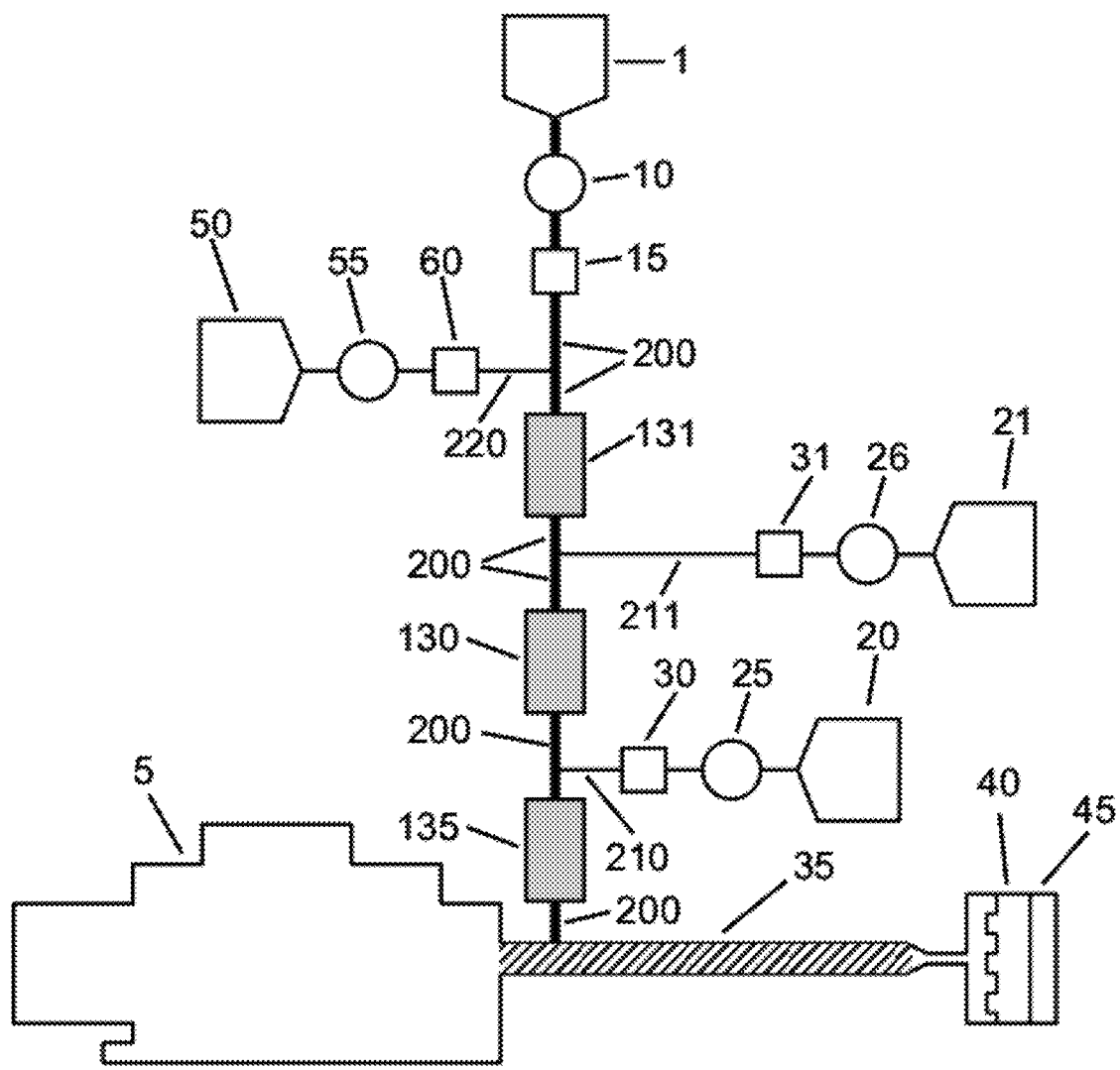
FIG. 15 is a schematic representation of an example of a method for producing a molded silicone rubber product, similar to that shown in FIG. 14, wherein the base feed line enters a mixer at a point after—or below the point at which—inhibitor master batch enters the base feed line and before—or above the point at which—additive master batch and catalyst master batch enter the base feed line, wherein the base feed line enters a second mixer at a point after—or below the point at which—additive master batch enters the base feed line and before—or above the point at which—catalyst master batch enters the base feed line, and wherein the base feed line enters a third mixer at a point after—or below the point at which—catalyst master batch enters the base feed line.

FIG. 15 shows another preferred embodiment, similar to that shown in FIG. 14, except that the base feed line 200 feeds into a mixer 131 after—or below the point at which—inhibitor master batch enters the base feed line 200 via inhibitor feed line 220 and before—or above the point at which—the additive master batch and the catalyst master batch enter the feed line 200 via additive feed line 211 and catalyst feed line 210, respectively. In this way, the liquid silicone rubber base from the base storage tank 1 and the inhibitor master batch from the inhibitor master batch storage tank 50 are mixed in the mixer 131. The mixer may be either a static mixer, a dynamic mixer, or an "orifice" as described above. Then, as in FIG. 14, the base feed line 200 feeds into a mixer 130 after—or below the point at which—additive master batch enters the base feed line 200 via additive feed line 211 and before—or above the point at which—catalyst master batch enters the base feed line 200 via catalyst feed line 210.

As will be appreciated by those having ordinary skill in the relevant art, the mixers 130, 131, and 135 can be varied beyond what is shown by the figures. For example, FIGS. 13-15 show the relative positions of mixers 130, 131, and 135. One of ordinary skill in the art will recognize readily that (for example) the arrangement of mixers in FIG. 15 may be altered to eliminate mixer 135 alone, mixer 130 alone, both mixers 130 and 135, or both mixers 131 and 135; these arrangements of mixers are within the scope of the present invention.

The base compositions described above, along with the introduction of the catalyst, inhibitor, and/or hydride cross linker at the point of mixing, decreases part variability, improves quality, shortens cure time, and lowers equipment costs. It also allows the curing rate of the liquid silicone rubber and the physical properties of the cured silicone rubber to be readily adjusted by modifying the ratio of base, catalyst, inhibitor, and/or hydride cross linker.

EXAMPLE 1

Physical Properties of a Standard Liquid Silicone Rubber Sheet

This EXAMPLE 1 describes the physical properties of a ASTM D395 standard 6 inch by 6 inch by 0.075 inch liquid silicone rubber sheet cured at 5 minutes at 350° F. using Formulation 1 at various concentrations of inhibitor, and compares them against the physical properties of an identical sheet obtained via a standard two part LSR process that employed the same components in Formulation 1 and 100% inhibitor. The data are shown in TABLE 2, below:

TABLE 2

| Physical Properties | Standard Two-Part LSR Process | Single LSR Base with 100% of the Inhibitor | Single LSR Base with 50% of the Inhibitor | Single LSR Base with 25% of the Inhibitor |
|---|---|---|---|---|
| Duro (Shore A) | 49 | 47 | 48 | 49 |
| Tear (lb/in) | 270 | 279 | 302 | 297 |
| Tensile (lb/in$^2$) | 1375 | 1403 | 1347 | 1282 |
| Elongation (%) | 610 | 547 | 689 | 637 |
| 100% Modulus (lb/in$^2$) | 324 | 345 | 276 | 288 |
| 200% Modulus (lb/in$^2$) | 528 | 566 | 469 | 486 |
| 300% Modulus (lb/in$^2$) | 709 | 771 | 625 | 650 |

As can be seen from TABLE 2, by using a single LSR base containing pre-mixed vinyl polymer, and silica, with varying concentrations of inhibitor (25%, 50%, and 100% of the inhibitor concentration found in the standard two-part LSR process), and by adding the catalyst separately, the virtually same heat cured physical properties may be obtained.

EXAMPLE 2

MDR Cure Profile

This EXAMPLE 2 describes the MDR cure profile at 115° C. using Formulation 1 at various concentrations of inhibitor, compared to the MDR cure profile of a standard two part LSR process using the same components in Formulation 1 and 100% inhibitor. The data are shown in TABLE 3, below:

TABLE 3

| MDR Cure Profile at 115° C. | Standard Two-Part LSR Process | Single LSR Base with 100% of the Inhibitor | Single LSR Base with 50% of the Inhibitor | Single LSR Base with 25% of the Inhibitor |
|---|---|---|---|---|
| $t_2$ (min.) | 0.88 | 0.47 | 0.29 | 0.22 |
| $t_{10}$ (min.) | 0.98 | 0.55 | 0.36 | 0.29 |
| $t_{50}$ (min.) | 1.15 | 0.69 | 0.47 | 0.39 |
| $t_{90}$ (min.) | 1.75 | 0.95 | 0.63 | 0.50 |
| Time at peak rate (min.) | 1.22 | 0.78 | 0.57 | 0.49 |
| Peak rate (in.-lbs./min.) | 30.69 | 34.56 | 38.65 | 43.27 |
| MH (in.-lbs.) | 13.31 | 12.75 | 11.51 | 11.60 |
| ML (in.-lbs.) | 0.01 | 0.00 | 0.00 | 0.02 |

As shown by the data of TABLE 3, the cure rates are readily modified by altering the inhibitor concentration. As used above, "$t_x$", where "x" is an integer, denotes the time required to obtain "x"% of the total cure or crosslinking, expressed in minutes.

Taken together, the data of TABLE 2 and TABLE 3 demonstrate the unexpected result that the compositions and methods of the present invention provide the end user with a wide range of cure times (TABLE 3) without concomitant sacrifice of physical properties (TABLE 2).

EXAMPLE 3

Molding Trial: Silicone Rubber Cap

This EXAMPLE 3 is a molding trial of a 183 gram silicone rubber cap with a diameter of 3¼ inches and a height of 2¼ inches. The normal production cycle time and temperature using a standard two part LSR process was 250 seconds at 300° F. Using the 50% inhibitor single LSR base of Formulation 1, the cycle time at 300° F. was reduced from 250 seconds to 150 seconds without the need for any postbaking. Below 150 seconds—to as low as 75 seconds—a good cure could be achieved throughout the thickest section of this part with postbaking for 5 minutes at 400° F., with no sign of deformation.

EXAMPLE 4

Molding Trial: 96-Well Silicone Rubber Pad

This EXAMPLE 4 is a molding trial of a 96-well silicone rubber pad with a length of 4.41 inches, a width of 3 inches, and 96 individual 0.37 inch thick nubs extending out of the thin base. The standard two part LSR production cycle for this part was 35 seconds at 270° F. With the single Formulation 1 LSR base with 50% inhibitor, the cure time was decreased to 4 seconds at a temperature of 375° F. Further, the overall cycle time per part was reduced to 24 seconds, compared to 60 seconds with the standard two part LSR process.

EXAMPLE 5

Molding Trial: Breast Pump Diaphragm

This EXAMPLE 5 is a molding trial of a 15.7 gram LSR silicone rubber diaphragm for a baby's milk breast pump produced in an eight cavity cold runner mold in which eight parts are automatically removed from the mold each injection molding cycle. The normal total production cycle using a standard two part LSR product is 50.7 seconds at 325° F. Using the single Formulation 1 LSR Base with 25% inhibitor, the total cycle time was decreased to 30.7 seconds at 325° F. without the need for any post baking. This results in a forty percent increase in cured product output and a 24% cost/part savings when all factors are taken into consideration.

In addition to the reduced molding cycle times, this system offers the advantages of a single Base with the vinyl and hydride components premixed. This eliminates a pump and the LSR A & B pumping and mixing variability and errors, as well as, control of the cure speed by enabling the molder to control the inhibitor level at the injection molding machine. In summary, this invention represents a more consistent, faster method of producing silicone molded LSR parts.

EXAMPLE 6

Molding Trials Comparison

This EXAMPLE 6 describes and compares the properties of silicone parts produced via standard two-part LSR techniques and a process of the present invention. As shown by TABLE 4, below, the production of parts with a wide range of dimensions and weights was compared. The durometer (hardness) of the silicone materials used varied from 20 to 70 Shore A.

TABLE 4

|  | Food Prepartion Part | Pump Diaphram | Medical Bulb | Cushion cap w/o Post-bake | Cushion Cap w/ Post-bake | Solid Silicone Rubber Tube Part |
|---|---|---|---|---|---|---|
| Height (cm) | 8.0 | 2.8 | 9.3 | 2.7 | 2.7 | — |
| Width (cm) | 5.0 | 5.8 | — | 5.5 | 5.5 | — |
| Thickness (cm) | 0.25 | — | — | — | — | — |
| Diameter (cm) | — | 6.7 | 5.9 | 6.8 | 6.8 | 4.0 |
| Length (cm) | — | — | — | — | — | 24.5 |
| Part Weight (g) | 23.7 | 15.6 | 47.4 | 181.4 | 181.4 | 422.4 |
| Durometer (Shore A) | 70 | 50 | 50 | 50 | 50 | 20 |
| Standard Two-Part LSR Molding Cycle Time (seconds) | 42 | 51 | 32 | 235 | 200 | 249 |

TABLE 4-continued

| | Food Prepartion Part | Pump Diaphram | Medical Bulb | Cushion cap w/o Post-bake | Cushion Cap w/ Post-bake | Solid Silicone Rubber Tube Part |
|---|---|---|---|---|---|---|
| LSR Select Molding Cycle Time (seconds) | 19 | 31 | 15 | 150 | 95 | 175 |
| Cycle Time Reduction (%) | 55.0 | 39.2 | 53.1 | 36.2 | 52.5 | 29.7 |
| Inhibitor Level (% of std LSR) | 27.5 | 6.25 | 6.25 | 6.25 | 6.25 | 50.0 |

The key results are the differences in actual production environment molding cycles between the Standard Two-Part LSR Molding Cycle and the LSR Select Molding Cycle. Depending upon the part and the equipment used, the cycle time reduction was between 29.7% and 55%. Cycle time reduction is only one of the advantages of the present invention. In addition, one obtains via the materials and methods of the present invention: higher-quality parts, less waste, elimination of room-temperature pot life issues, and enhanced parts production consistency.

The faster cure speed, as shown in TABLE 4, is due to the controlled reduction of the inhibitor level in the system. The bottom row of the chart, labelled "Inhibitor Level (% of std LSR)," shows that the inhibitor can be reduced to only 6.25% of what is normally added to a standard two-part LSR molding cycle. Depending upon the part size, however, higher amounts of inhibitor are added (e.g., 27.5% and 50% of the standard amount), yet this higher amount is still less than what is used in standard two-part LSR molding systems (even the very large 422 g part—column labelled "Solid Silicone Rubber Tube Part" of TABLE 4—which requires a long mold filling time. In sum, the compositions and methods of the present invention provide the user with much greater control over the molding process than standard two-part LSR molding cycles of the prior art, which employ set inhibitor levels.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method for producing a molded silicone rubber product comprising:
    a) feeding into a base feed line a liquid silicone rubber base comprising:
        i) at least one vinyl siloxane polymer; and
        ii) at least one hydride crosslinker;
    b) feeding into a catalyst feed line a catalyst master batch comprising:
        i) at least one catalyst; and
        ii) optionally, at least one vinyl siloxane polymer;
    c) feeding into an inhibitor feed line an inhibitor master batch comprising:
        i) at least one liquid injection molding inhibitor; and
        ii) optionally, at least one vinyl siloxane polymer;
    d) optionally feeding into an optional additive feed line an optional at least one additive;
    e) directing said liquid silicone rubber base and said catalyst master batch and said inhibitor master batch, and optionally directing said optional at least one additive, into the barrel of an injection molding machine;
    f) operating said injection molding machine, thereby mixing said liquid silicone rubber base, said catalyst master batch, said inhibitor master batch, and said optional at least one additive; and
    g) curing said mixed liquid silicone rubber base, catalyst master batch, inhibitor master batch, and optional at least one additive by heating.

2. The method of claim 1, wherein said at least one vinyl siloxane polymer of said liquid silicone rubber base, said catalyst master batch, and said inhibitor master batch are independently selected from the group consisting of:

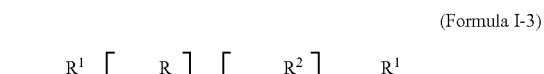
(Formula I-3)

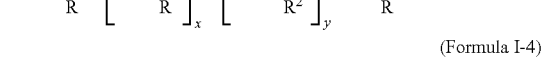
(Formula I-4)

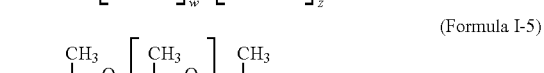
(Formula I-5)

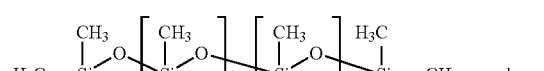
(Formula I-6)

and (Formula I-7)

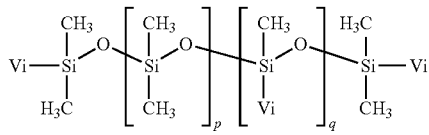

and combinations thereof, wherein:
a) the radical R are, independently, selected from the group consisting of monovalent hydrocarbon radicals and halogenated monovalent hydrocarbon radicals;
b) the radical $R^1$ are, independently, selected from the group consisting of phenyl, lower alkenyl of 2 to 8 carbon atoms, lower alkyl of 1 to 8 carbon atoms and mononuclear aryl radicals;
c) the radical $R^2$ are, independently, selected from the group consisting of an alkyl radical, a mononuclear aryl radical, a lower alkyl radical of 1 to 8 carbon atoms, a phenyl radical, lower alkenyl of 2 to 8 carbon atoms, and a vinyl group;
d) the radical R" are, independently, selected from the same groups as the radical $R^1$;
e) Vi denotes vinyl;
f) is an integer from about 100 to about 10,000;
g) n is an integer from about 100 to about 400;
h) o is an integer from about 2 to about 8;
i) p is an integer from about 100 to about 200;
j) q is an integer from about 5 to about 15;
k) w is an integer from about 0 to about 500;
l) x is an integer from about 100 to about 10,000;
m) y is an integer from about 0 to about 300; and
n) z is an integer from about 0 to about 200.

3. The method of claim 2, wherein said at least one hydride crosslinker is selected from the group consisting of (Formula II-3)

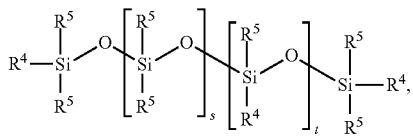

(Formula II-4)

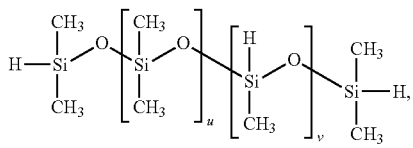

(Formula II-5)

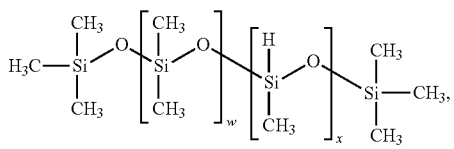

(Formula II-6)

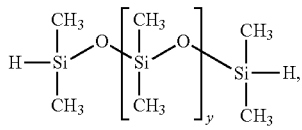

(Formula II-7)

$M_2^H Q$, and combinations thereof, wherein:
a) each $R^4$ is selected, independently, from the group consisting of hydrogen, monovalent hydrocarbon radicals, and halogenated monovalent hydrocarbon radicals;
b) each $R^5$ radical is selected, independently, from the group consisting of monovalent hydrocarbon radicals, and halogenated monovalent hydrocarbon radicals;
c) s is an integer from about 1 to about 1000;
d) t is an integer from about 5 to about 200;
e) u is an integer from about 14 to about 30;
v is an integer from about 12 to about 21;
g) w is an integer from about 2 to about 8;
h) x is an integer from about 3 to about 9;
i) y is an integer from about 5 to about 15;
j) M is monofunctional trimethylsilyl or $(CH_3)_3SiO_{1/2}$;
k) H is hydrogen; and
l) Q is tetrafunctional silicon dioxide or $SiO_{4/2}$.

4. The method of claim 3, wherein said at least one catalyst is a platinum complex formed from a reaction between $H_2PtCl_6 + 6H_2O$ + dimethyl vinyl terminated polydimethlysiloxane polymer.

5. The method of claim 4, wherein said at least one liquid injection molding inhibitor of said inhibitor master batch is selected from the group consisting of:

(Formula III)

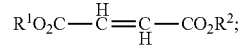

(Formula VI)

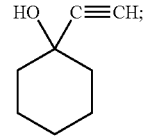

and combinations thereof, wherein:
a) $R^1$ has the formula:
$$-R^3-C\equiv C-R^4 \quad \text{(Formula IV)};$$
b) $R^2$ is selected from the group consisting of:
$$-R^3-C\equiv C-R^4 \quad \text{(Formula IV)};$$
hydrogen; triorganosilyl radicals; siloxanes; and Formula (V)

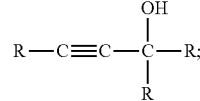

c) $R^3$ is selected from the group consisting of: of divalent hydrocarbonradicals consisting of linear or branched alkyl radicals having from about 1 to about 10 carbon atoms; linear or branched alkenyl radicals having from about 1 to about 10 carbon atoms; linear or branched alkynyl radicals having from about 1 to about 10 carbon atoms; cycloalklyl radicals having from about 3 to about 12 carbon atoms; cycloalkenyl radicals having from about 3 to about 12 carbon atoms; cycloalkynyl radicals having from about 8 to about 16 carbon atoms; fluorinated linear or branched alkyl radicals having from about 1 to about 10 carbon atoms; chlorinated linear or branched alkyl radicals having from about 1 to about 10 carbon atoms; brominated linear or branched alkyl radicals having from about 1 to about 10 carbon atoms; fluorinated linear or branched alkenyl radicals having from about 1 to about 10 carbon atoms; chlorinated linear or branched alkenyl radicals having from about 1 to about 10 carbon atoms; brominated linear or branched alkenyl radicals having from about 1 to about 10 carbon atoms; fluorinated linear or branched alkynyl radicals having from about 1 to about 10 carbon atoms; chlorinated linear or branched alkynyl radicals having from about 1 to about 10 carbon atoms; brominated linear or branched alkynyl radicals having from about 1 to about 10 carbon atoms; hydrocarbonoxy radicals containing at least two carbon atoms; fluorinated hydrocarbonoxy radicals containing at least two carbon atoms; chlorinated hydrocarbonoxy radicals containing at least two carbon atoms; brominated hydrocarbonoxy radicals containing at least two carbon atoms; aryl radicals; linear or branched alkyl aryl radicals; fluorinated aryl radicals; chlorinated aryl radicals; brominated aryl radicals; fluorinated linear or branched alkyl-, alkenyl-, or alkynyl aryl radicals; chlorinated linear or branched alkyl-, alkenyl-, or alkynyl aryl radicals; and brominated linear or branched alkyl-, alkenyl-, or alkynyl aryl radicals;

d) $R^4$ is selected from the group of monovalent radicals consisting of: hydrogen, linear or branched alkyl radicals having from about 1 to about 10 carbon atoms; linear or branched alkenyl radicals having from about 1 to about 10 carbon atoms; linear or branched alkynyl radicals having from about 1 to about 10 carbon atoms; cycloalklyl radicals having from about 3 to about 12 carbon atoms; cycloalkenyl radicals having from about 3 to about 12 carbon atoms; cycloalkynyl radicals having from about 8 to about 16 carbon atoms; fluorinated linear or branched alkyl radicals having from about 1 to about 10 carbon atoms; chlorinated linear or branched alkyl radicals having from about 1 to about 10 carbon atoms; brominated linear or branched alkyl radicals having from about 1 to about 10 carbon atoms; fluorinated linear or branched alkenyl radicals having from about 1 to about 10 carbon atoms; chlorinated linear or branched alkenyl radicals having from about 1 to about 10 carbon atoms; brominated linear or branched alkenyl radicals having from about 1 to about 10 carbon atoms; fluorinated linear or branched alkynyl radicals having from about 1 to about 10 carbon atoms; chlorinated linear or branched alkynyl radicals having from about 1 to about 10 carbon atoms; brominated linear or branched alkynyl radicals having from about 1 to about 10 carbon atoms; hydrocarbonoxy radicals containing at least two carbon atoms; fluorinated hydrocarbonoxy radicals containing at least two carbon atoms; chlorinated hydrocarbonoxy radicals containing at least two carbon atoms; brominated hydrocarbonoxy radicals containing at least two carbon atoms aryl radicals; linear or branched alkyl aryl radicals; fluorinated aryl radicals; chlorinated aryl radicals; brominated aryl radicals; fluorinated linear or branched alkyl-, alkenyl-, or alkynyl aryl radicals; chlorinated linear or branched alkyl-, alkenyl-, or alkynyl aryl radicals; brominated linear or branched alkyl-, alkenyl-, or alkynyl aryl radicals; and triorganosilyl radicals; and e) R is selected from the group consisting of: hydrogen; alkyl; phenyl; and $C_xH_y$, where x is an integer from about 2 to about 10, and y is an integer from about 4 to about 21.

6. The method of claim 5, wherein said step d) occurs and said at least one additive is selected from the group consisting of color master batches, UV stabilizers, light stabilizers, self bonding additives, anti-microbial additives, thermal stabilizers, release agents, antistatic additives, flame proofing additives, low compression set additives, durometer adjustment additives, oil resistance additives, anti-crepe hardening additives, mold release additives, plasticizers, thickening or consistency increase additives, blowing agents, and combinations thereof.

7. The method of claim 1, wherein said liquid silicone rubber base further comprises at least one filler.

8. The method of claim 7, wherein said filler is in situ treated fumed silica treated with hexamethyldisilazane and tetramethyldivinyldisilazane.

9. The method of claim 7, wherein said liquid silicone rubber base further comprises at least one pre-structuring compound.

10. The method of claim 9, wherein said at least one pre-structuring compound has the formula:

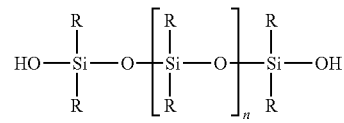

wherein:
a) R is selected from the group consisting of monovalent hydrocarbon radicals, and halogenated monovalent hydrocarbon radicals; and
b) n is an integer from about 0 to about 12.

11. The method of claim 9, wherein said liquid silicone rubber base further comprises at least one release agent.

12. The method of claim 11, wherein said at least one release agent has the formula $M_xQ^{OH}$, wherein x is an integer from about 1 to about 3.

13. The method of claim 1, wherein: a) the base feed line feeds separately into the barrel of the injection molding machine; b) the catalyst feed line feeds separately into the barrel of the injection molding machine; c) the inhibitor feed line feeds separately into the barrel of the injection molding machine; and d) the optional additive feed line feeds separately into the barrel of the injection molding machine.

14. The method of claim 1, wherein at least one vinyl siloxane polymer is present in the inhibitor master batch.

15. The method of claim 1, wherein step d) occurs.

16. A method for producing a molded silicone rubber product comprising:
a) feeding into a base feed line a liquid silicone rubber base comprising:
i) at least one vinyl siloxane polymer;
ii) at least one hydride crosslinker;
iii) at least one filler;
iv) at least one pre-structuring compound; and
v) at least one release agent;
b) feeding into a catalyst feed line a catalyst master batch comprising:
i) at least one catalyst; and
ii) optionally, at least one vinyl siloxane polymer;
c) feeding into an inhibitor feed line an inhibitor master batch comprising:
i) at least one liquid injection molding inhibitor; and
ii) optionally, at least one vinyl siloxane polymer;
d) optionally feeding into an optional additive feed line an optional at least one additive;
e) directing said liquid silicone rubber base and said catalyst master batch and said inhibitor master batch, and optionally directing said optional at least one additive, into the barrel of an injection molding machine;

f) operating said injection molding machine, thereby mixing said liquid silicone rubber base, said catalyst master batch, said inhibitor master batch, and said optional at least one additive; and g) curing said mixed liquid silicone rubber base, catalyst master batch, inhibitor master batch, and optional at least one additive by heating., wherein said base feed line feeds into the barrel of the injection molding machine, and said catalyst feed line feeds into said base feed line.

17. The method of claim 16, wherein said liquid silicone rubber base further comprises at least one liquid injection molding inhibitor.

18. The method of claim 17, wherein said inhibitor feed line feeds into the base feed line.

19. The method of claim 18, wherein said optional additive feed line is present and feeds into the base feed line.

20. The method of claim 19, wherein after the catalyst feed line, the inhibitor feed line, and the optional additive feed line have fed into the base feed line, the base feed line feeds into a mixer.

21. A method for producing a molded silicone rubber product comprising:

a) feeding into a base feed line a liquid silicone rubber base comprising:
  i), at least one vinyl siloxane polymer; and
  ii) at least one hydride crosslinker;

b) feeding into a catalyst feed line a catalyst master batch comprising:
  i) at least one catalyst; and
  ii) optionally, at least one vinyl siloxane polymer;

c) feeding into an inhibitor feed line an inhibitor master batch comprising:
  i) at least one liquid injection molding inhibitor; and
  ii) optionally, at least one vinyl siloxane polymer;

d) optionally feeding into an optional additive feed line an optional at least one additive;

e) directing said liquid silicone rubber base and said catalyst master batch and said inhibitor master batch, and optionally directing said optional at least one additive, into the barrel of an injection molding machine;

f) operating said injection molding machine, thereby mixing said liquid silicone rubber base, said catalyst master batch, said inhibitor master batch, and said optional at least one additive; and g) curing said mixed liquid silicone rubber base, catalyst master batch, inhibitor master batch, and optional at least one additive by heating, wherein said base feed line feeds into the barrel of the injection molding machine, and said catalyst feed line feeds into said base feed line.

22. The method of claim 21, wherein said liquid silicone rubber base further comprises at least one liquid injection molding inhibitor.

23. The method of claim 22, wherein said inhibitor feed line feeds into the base feed line.

24. The method of claim 23, wherein said optional additive feed line is present and feeds into the base feed line.

25. The method of claim 24, wherein after the catalyst feed line, the inhibitor feed line, and the optional additive feed line have fed into the base feed line, the base feed line feeds into a mixer.

* * * * *